(12) United States Patent
Sato et al.

(10) Patent No.: US 6,696,204 B2
(45) Date of Patent: Feb. 24, 2004

(54) POLYMER BATTERY AND METHOD OF MANUFACTURE

(75) Inventors: Takaya Sato, Chiba (JP); Kimiyo Hata, Chiba (JP); Tatsuya Maruo, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 76 days.

(21) Appl. No.: 09/880,847

(22) Filed: Jun. 15, 2001

(65) Prior Publication Data

US 2002/0009649 A1 Jan. 24, 2002

(30) Foreign Application Priority Data

Jun. 16, 2000 (JP) ...... 2000-181708
Oct. 31, 2000 (JP) ...... 2000-332226
Apr. 20, 2001 (JP) ...... 2001-123374

(51) Int. Cl.[7] .............................. H01M 10/40
(52) U.S. Cl. .................. 429/309; 429/316; 429/317
(58) Field of Search ................ 429/306–317; 29/623.5

(56) References Cited

U.S. PATENT DOCUMENTS

| 5,296,318 A | 3/1994 | Gozdz et al. ........ 429/252 |
|---|---|---|
| 5,418,091 A | 5/1995 | Gozdz et al. |
| 5,523,180 A * | 6/1996 | Armand et al. ........ 429/317 X |
| 5,571,392 A * | 11/1996 | Sato et al. ........ 204/296 |
| 5,834,136 A * | 11/1998 | Gao et al. ........ 429/309 |
| 5,916,475 A * | 6/1999 | Michot et al. ........ 429/306 X |
| 6,472,106 B1 * | 10/2002 | Sato ........ 429/317 |

FOREIGN PATENT DOCUMENTS

| EP | 1164654 | * 12/2001 | ...... H01M/10/40 |
|---|---|---|---|
| JP | 312535 | 11/1999 | ...... H01M/10/40 |

\* cited by examiner

*Primary Examiner*—Stephen Kalafut
(74) *Attorney, Agent, or Firm*—Birch, Stewart, Kolasch & Birch, LLP

(57) ABSTRACT

A polymer battery which includes a cell assembly having a positive electrode, a negative electrode, and a separator composed primarily of a fluoropolymer is manufactured by impregnating the cell assembly with an electrolyte composition containing (A) an ion-conductive salt, (B) a solvent in which the ion-conductive salt is soluble and (C) a compound having at least two reactive double bonds per molecule, then reacting the component C compound to form a three-dimensional network structure. The polymer battery has a high safety, a good thermal cycling resistance and robust characteristics even when held at an elevated temperature, making it particularly suitable for use as a lithium secondary cell or a lithium ion secondary cell.

18 Claims, 6 Drawing Sheets

POLYMER BATTERY AND METHOD OF MANUFACTURE

BACKGROUND OF THE INVENTION

1. Field of the Invention

The present invention relates to a polymer battery having a high degree of safety, and to a method for its manufacture.

2. Prior Art

Advances over the past few years in electronics equipment have led to smaller sizes, lighter weights and higher energy densities, and also to a desire in the industry for the development of secondary batteries which can be recharged many times. Lithium secondary cells and lithium ion secondary cells in which the electrolyte is a non-aqueous solution rather than an aqueous solution have attracted particular interest.

In solution-type lithium secondary cells where lithium metal or a lithium alloy serves as the negative electrode, thread-like bodies of lithium crystal known as dendrites form on the negative electrode with repeated charging and discharging, resulting in undesirable effects such as short-circuiting of the electrodes. Hence, a need has been felt for a solid polymer electrolyte that inhibits dendrite deposition and also has the properties of a separator.

Lithium ion secondary cells were developed to resolve the problem of dendrite formation in lithium secondary cells. Yet, because the separator used in lithium ion secondary cells to prevent short-circuiting between the electrodes is incapable of adequately retaining the electrolyte, leakage of the electrolyte solution tends to arise, making it necessary to use a metal can as the outer enclosure. This increases production costs for the battery and prevents a sufficient reduction in battery weight from being achieved. Therefore, to eliminate electrolyte leakage and at the same time reduce the weight of the cell, a need has similarly arisen in lithium ion secondary cells for a very safe polymer electrolyte which also functions as a separator.

Vigorous efforts are thus underway to develop polymer electrolytes prepared with fluoropolymer materials.

Examples include physically crosslinked gels arrived at using such fluoropolymers as polyvinylidene fluoride (PVDF), vinylidene fluoride-hexafluoropropylene copolymers, vinylidene fluoride-chlorotrifluoroethylene (CTFE) copolymers (P(VDF-CTFE)), vinylidene fluoride-hexafluoropropylene fluororubbers, vinylidene fluoride-tetrafluoroethylene-hexafluoropropylene fluororubbers and vinylidene fluoride-tetrafluoroethylene-perfluoro(alkyl vinyl ether) fluororubbers.

Such fluoropolymers are known to have good chemical stability to the electrolytes and ions in the solutions used in batteries. For example, U.S. Pat. No. 5,296,318 and U.S. Pat. No. 5,418,091 describe both a gelled electrolyte containing a lithium salt dissolved in a copolymer of vinylidene fluoride (VDF) and hexafluoropropylene (HFP), abbreviated hereinafter as "P(VDF-HFP)," and also a lithium intercalation cell using the gelled electrolyte. These cells have a better ionic conductivity and discharge characteristics, and in particular a better rate capability, than cells made using earlier gelled electrolytes. That is, increasing the discharge current does not lower to any great degree the discharge capacity.

Yet, although gelled electrolytes made with PVDF-based copolymers such as P(VDF-HFP) copolymers have excellent properties, they also have a number of serious drawbacks.

The copolymerization involved in formation of the PVDF copolymer lowers the crystallinity of the polymer, making it subject to swelling by the electrolyte. Hence, in spite of the good electrical properties achieved, PVDF copolymers are more prone to deformation and have a lower physical strength than PVDF homopolymers. This appears to be attributable to the essential nature of the material. As a result, a film thickness of at least 60 $\mu$m is required for practical use.

Such a large thickness is clearly a drawback when compared with the normal film thickness of 25 $\mu$m in separators currently used in conventional solution-type lithium ion cells. The inability to achieve a lower film thickness in lithium ion secondary cells that use a solid electrolyte has until now made it impossible to exploit the considerable practical advantages of such cells.

Another problem with such PVDF-based copolymers is that, because they are polymerized as copolymers, they have a structure in which crystallization has been inhibited to a great degree, and thus melt at a lower temperature. For example, PVDF homopolymer has a melting point of 170° C., whereas P(VDF-HFP) copolymer has a melting point of 140° C.

Furthermore, in the gelled state containing a large amount of electrolyte solution, the gel film distortion temperature is lower than the melting point of the polymer by itself. In fact, heat distortion occurs at 130° C. in a gel film made with PVDF homopolymer, whereas it occurs at about 90° C. in a gel film made with P(VDF-HFP) copolymer.

Because the heat distortion temperature in the gelled state is low, at elevated temperatures, the separator has a lower strength and is softer than at room temperature, making it more likely for short circuits to occur between the positive and negative electrodes. For example, in cases where expanded metal is used as the current collector, the electrodes cut into the expanded metal. Local thinning occurs in corresponding portions of the PVDF-based copolymer electrolyte, increasing the likelihood of shorting between the positive and negative electrodes. This is a major obstacle to battery production.

Also, the use of a fluoropolymer electrolyte in electrochemical devices such as lithium ion secondary cells and electrical double-layer capacitors often leads to problems with adhesion of the electrolyte (separator) to the electrodes and current collectors. Inadequate adhesion can result in poor battery storage properties. Storage of the battery at room temperature or at an elevated temperature (e.g., 40° C., 60° C., 80° C., 100° C.) results in a deterioration in the capacity and frequent internal shorting. Moreover, lowering the melting point places limits on use of the battery at high temperatures and, as noted above, compromises the high-temperature storage properties.

Because fluoropolymers have an inherently low surface energy and thus do not adhere well to many substances, sufficient adhesion to the positive and negative electrodes cannot be achieved when a fluoropolymer electrolyte is disposed as an electrolyte film between the electrodes.

Quoting directly from JP-A 11-312535:"Fluoropolymers with a weight-average molecular weight of at least 550,000 exhibit excellent adhesion to the active material layers of positive and negative electrodes. It is therefore possible to bond a solid or gelled polymer electrolyte with an electrode active material layer to a sufficient adhesive strength, thus lowering internal resistance within the electrodes and achieving good charge/discharge cycle properties."

However, the degree of swelling by the fluoropolymer varies depending on the type of electrolyte solution used, and so sufficient adhesive strength is not achieved with all electrolyte solutions.

The heat distortion temperature of a gel is not readily affected by the molecular weight of the polymer. Hence, adhesion within the high temperature region is inadequate even when a fluoropolymer having a sufficiently large molecular weight is used. For this reason and because fluoropolymers have a large heat expansion coefficient, the electrodes and the electrolyte tend to separate with repeated heat cycling between high temperatures and room temperature.

Polymer batteries must also have a high degree of safety. Electrolytes composed of a lithium-based electrolyte salt such as $LiPF_6$ dissolved in a non-aqueous solvent such as a low-molecular-weight carbonate (e.g., ethylene carbonate, propylene carbonate, diethyl carbonate) have been widely used in prior-art lithium secondary cells because of their relatively high conductivity and stable electric potential.

Yet, in spite of their high performance, lithium secondary cells made with such non-aqueous electrolytes are flammable. For example, if a large current suddenly flows into the cell when a short circuit occurs, the cell heats up, causing the organic solvent-containing electrolyte solution to vaporize or decompose. Gas generated as a result may damage or rupture the cell, or even cause it to ignite. Fires sometimes occur because of internal heating due to excessive charging of the cell, and there is even a danger of fire from short circuits caused by the puncture of a charged cell with a nail or other sharp object.

A polymer electrolyte must therefore also have the ability to prevent the cell from igniting. It is thus essential to increase safety by minimizing evaporation of the liquid electrolyte and creating a state in which the electrolyte solution cannot readily vaporize even if the temperature at the interior of the cell rises significantly, and moreover to select a component, namely a polymer, which inhibits electrolyte vaporization in the electrolyte/polymer mixture referred to throughout this specification as the gel.

However, the above-described fluoropolymers have a low affinity to electrolyte solutions. Forming a complex of such a fluoropolymer with the electrolyte solution and rendering the complex into a gel does not in any way alter the rate of electrolyte evaporation, and thus cannot increase the safety of the cell.

SUMMARY OF THE INVENTION

It is therefore an object of the present invention to provide a polymer battery which has a high safety, good heat cycling resistance and robust characteristics even when held at a high temperature, and is thus particularly suitable for use as a lithium secondary cell or a lithium ion secondary cell. Another object of the invention is to provide a method of manufacturing such polymer batteries.

Accordingly, a first aspect of the invention provides a polymer battery which includes a cell assembly having a positive electrode, a negative electrode, and a separator disposed between the positive and negative electrodes that is composed primarily of a fluoropolymer, and which is made by impregnating the cell assembly with an electrolyte composition containing (A) an ion-conductive salt,
(B) a solvent in which the ion-conductive salt is soluble, and
(C) a compound having at least two reactive double bonds per molecule, then reacting the component C compound to form a three-dimensional network structure.

In the polymer battery of the above first aspect of the invention, the electrolyte composition containing components A to C preferably has an ionic conductivity, as measured by the AC impedance method, of at least $1 \times 10^{-4}$ S/cm.

A second aspect of the invention provides a polymer battery which includes a cell assembly having a positive electrode, a negative electrode, and a separator disposed between the positive and negative electrodes that is composed primarily of a fluoropolymer, and which is made by impregnating the cell assembly with an electrolyte composition containing (A) an ion-conductive salt,
(B) a solvent in which the ion-conductive salt is soluble,
(C) a compound having at least two reactive double bonds per molecule, and
(D) a hydroxyalkyl polysaccharide derivative, then forming a semi-interpenetrating polymer network structure in which molecular chains on the component D polymer are interlocked with a three-dimensional polymer network structure obtained by crosslinking the component C compound.

The polymer battery of the above second aspect of the invention preferably has a ratio $(C_1/C_2) \times 100$ between the ionic conductivity $C_1$ of an electrolyte composition which contains components A to D and in which components C and D together form a semi-interpenetrating polymer network structure, and the ionic conductivity $C_2$ of an electrolyte composition which contains components A, B and C or components A, B and D and does not have a semi-interpenetrating polymer network structure of from 80 to 100%.

A third aspect of the invention provides a polymer battery which includes a cell assembly having a positive electrode, a negative electrode, and a separator disposed between the positive and negative electrodes that is composed primarily of a fluoropolymer, and which is made by impregnating the cell assembly with an electrolyte composition containing (A) an ion-conductive salt,
(B) a solvent in which the ion-conductive salt is soluble,
(C) a compound having at least two reactive double bonds per molecule, and
(E) a polyvinyl alcohol derivative, then forming a semi-interpenetrating polymer network structure in which molecular chains on the component E polymer are interlocked with a three-dimensional polymer network structure obtained by crosslinking the component C compound.

The polyvinyl alcohol derivative E is preferably a polymeric compound containing polyvinyl alcohol units and having an average degree of polymerization of at least 20 in which some or all of the hydroxyl groups on the polyvinyl alcohol units are substituted with oxyalkylene-containing groups.

The polyvinyl alcohol derivative E is also preferably a polymeric compound containing polyvinyl alcohol units and having an average degree of polymerization of at least 20 in which some or all of the hydroxyl groups on the polyvinyl alcohol units are substituted with both oxyalkylene-containing groups and cyano-substituted monovalent hydrocarbon groups.

Also preferably, the polyvinyl alcohol derivative E is a polymeric compound containing polyvinyl alcohol units and having an average degree of polymerization of at least 20 in which some or all of the hydroxyl groups on the polyvinyl alcohol units are substituted with cyano-substituted monovalent hydrocarbon groups. The polymeric compound having substituted thereon cyano-substituted monovalent hydrocarbon groups is preferably included in an amount of 0.1 to 8 wt % based on the compound having at least two reactive double bonds per molecule C. Typically the cyano-substituted monovalent hydrocarbon groups are cyanoethyl groups.

The polymer battery of the above third aspect of the invention preferably has a ratio $(C_1/C_2) \times 100$ between the ionic conductivity $C_1$ of an electrolyte composition which contains components A, B, C and E and in which components C and E together form a semi-interpenetrating polymer network structure, and the ionic conductivity $C_2$ of an electrolyte composition which contains components A, B and C or components A, B and E and does not have a semi-interpenetrating polymer network structure of from 80 to 100%.

A fourth aspect of the invention provides a polymer battery which includes a cell assembly having a positive electrode, a negative electrode, and a separator disposed between the positive and negative electrodes that is composed primarily of a fluoropolymer, and which is made by impregnating the cell assembly with an electrolyte composition containing (A) an ion-conductive salt,
(B) a solvent in which the ion-conductive salt is soluble,
(C) a compound having at least two reactive double bonds per molecule, and
(F) a polyglycidol derivative, then forming a semi-interpenetrating polymer network structure in which molecular chains on the component F polymer are interlocked with a three-dimensional polymer network structure obtained by crosslinking the component C compound.

The polymer battery of the above fourth aspect of the invention preferably has a ratio $(C_1/C_2) \times 100$ between the ionic conductivity $C_1$ of an electrolyte composition which contains components A, B, C and F and in which components C and F together form a semi-interpenetrating polymer network structure, and the ionic conductivity $C_2$ of an electrolyte composition which contains components A, B and C or components A, B and F and does not have a semi-interpenetrating polymer network structure of from 80 to 100%.

In the polymer battery of any one of the above first to fourth aspects of the invention, the compound having at least two reactive double bonds per molecule C preferably has at least two reactive double bonds per molecule and constitutes at least 1 wt % of the overall electrolyte composition.

A fifth aspect of the invention provides a method of manufacturing a polymer battery, which method includes the steps of:

(a) impregnating an electrolyte composition containing
  (A) an ion-conductive salt,
  (B) a solvent in which the ion-conductive salt is soluble, and
  (C) a compound having at least two reactive double bonds per molecule into a cell assembly having a positive electrode, a negative electrode, and a separator disposed between the positive and negative electrodes; then
(b) reacting component C to form a three-dimensional network structure.

A sixth aspect of the invention provides a method of manufacturing a polymer battery, which method includes the steps of:

(a) impregnating an electrolyte composition containing
  (A) an ion-conductive salt,
  (B) a solvent in which the ion-conductive salt is soluble,
  (C) a compound having at least two reactive double bonds per molecule, and
  (D) a hydroxyalkyl polysaccharide derivative into a cell assembly having a positive electrode, a negative electrode, and a separator disposed between the positive and negative electrodes; then
(b) forming a semi-interpenetrating polymer network structure in which molecular chains on the component D polymer are interlocked with a three-dimensional polymer network structure obtained by crosslinking the component C compound.

A seventh aspect of the invention provides a method of manufacturing a polymer battery, which method includes the steps of:

(a) impregnating an electrolyte composition containing
  (A) an ion-conductive salt,
  (B) a solvent in which the ion-conductive salt is soluble,
  (C) a compound having at least two reactive double bonds per molecule, and
  (E) a polyvinyl alcohol derivative into a cell assembly having a positive electrode, a negative electrode, and a separator disposed between the positive and negative electrodes; then
(b) forming a semi-interpenetrating polymer network structure in which molecular chains on the component E polymer are interlocked with a three-dimensional polymer network structure obtained by crosslinking the component C compound.

An eighth aspect of the invention provides a method of manufacturing a polymer battery, which method includes the steps of:

(a) impregnating an electrolyte composition containing
  (A) an ion-conductive salt,
  (B) a solvent in which the ion-conductive salt is soluble,
  (C) a compound having at least two reactive double bonds per molecule, and
  (F) a polyglycidol derivative into a cell assembly having a positive electrode, a negative electrode, and a separator disposed between the positive and negative electrodes; then
(b) forming a semi-interpenetrating polymer network structure in which molecular chains on the component F polymer are interlocked with a three-dimensional polymer network structure obtained by crosslinking the component C compound.

The present invention resolves a number of problems with prior-art polymer batteries in which fluoropolymers are used as an electrolyte material, thereby making it possible to fully and effectively exploit the excellent properties of fluoropolymers.

That is, we have found that a polymer battery which includes a cell assembly having a positive electrode, a negative electrode, and a separator disposed between the positive and negative electrodes that is composed primarily of a fluoropolymer has many desirable and useful properties when manufactured by either:

(i) impregnating the cell assembly with an electrolyte composition containing (A) an ion-conductive salt, (B) a solvent in which the ion-conductive salt is soluble and (C) a compound having at least two reactive double bonds per molecule, then reacting component (C) to form a three-dimensional network structure; or (ii) impregnating the cell assembly with an electrolyte composition containing (A) an ion-conductive salt, (B) a solvent in which the ion-conductive salt is soluble, (C) a compound having at least two reactive double bonds per molecule, and any one of (D) a hydroxyalkyl polysaccharide derivative, (E) a polyvinyl alcohol derivative or (F) a polyglycidol derivative, then forming a semi-interpenetrating polymer network structure in which molecular chains on the component D, E or F polymer are interlocked with a three-dimensional polymer network structure obtained by crosslinking the compound having at least two reactive double bonds per molecule of component C.

The inventive polymer batteries made in either of these ways have improved adhesion and are thus far less subject to separation of the electrodes from the electrolyte (separator) due to repeated heat cycling between an elevated temperature and room temperature, making it possible to prevent a rise in internal resistance. Moreover, as shown in FIG. 9 described below, the rate of evaporation is so slow compared with that for prior-art fluoropolymer electrolytes that vaporization takes place only with difficulty, making it possible to effectively suppress evaporation of the electrolyte solution. The result is a polymer battery which does not ignite from internal heat, and is thus very safe. In addition, the polymer batteries of the invention have a high heat cycling resistance, and are thus able to sustain an excellent rate capability even when held at a high temperature. This combination of features make the inventive polymer batteries particularly well suited for use as lithium secondary cells and lithium ion secondary cells.

DESCRIPTION OF THE PREFERRED EMBODIMENTS

First Embodiment of the Invention

Figure 1:
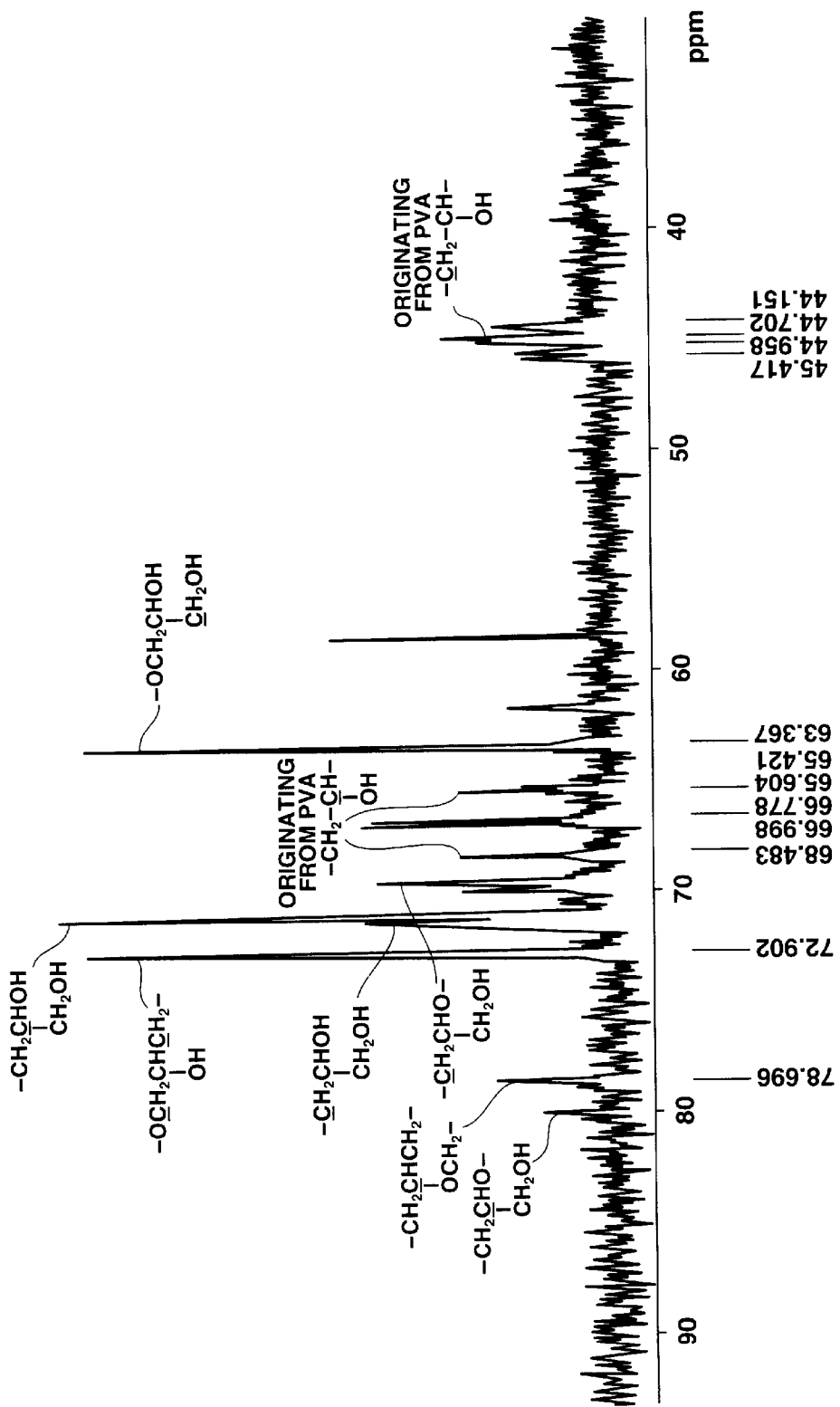
FIG. 1 is a $^{13}$C-NMR spectrum of dihydroxypropylated polyvinyl alcohol.
Figure 2:
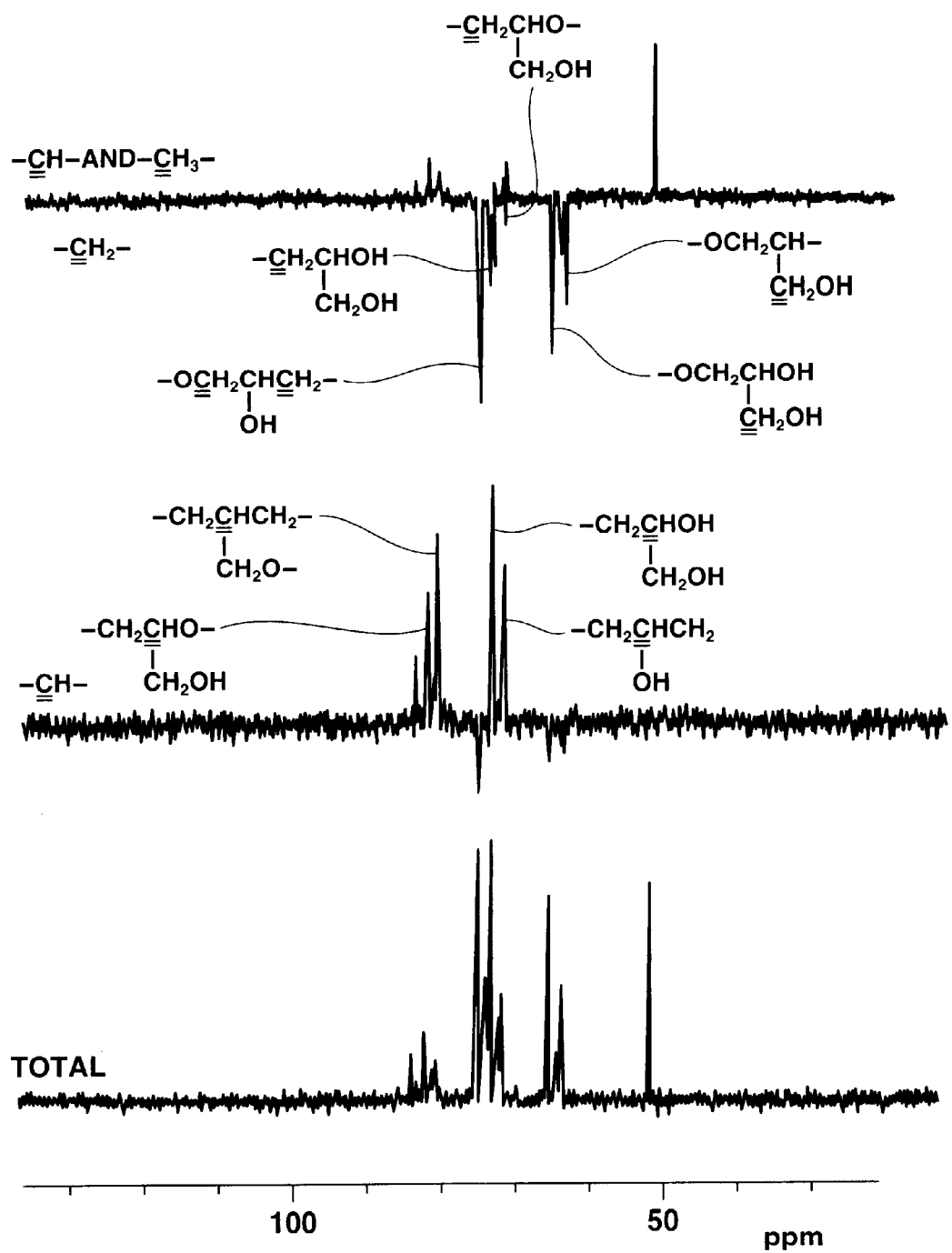
FIG. 2 is a $^{13}$C-NMR spectrum of polyglycidol.

The polymer battery according to a first embodiment of the invention includes a cell assembly having a positive electrode, a negative electrode, and a separator disposed between the positive and negative electrodes that is composed primarily of a fluoropolymer. The battery is made by impregnating the cell assembly with an electrolyte composition containing (A) an ion-conductive salt, (B) a solvent in which the ion-conductive salt is soluble, and (C) a compound having at least two reactive double bonds per molecule, then reacting the component C compound to form a three-dimensional network structure.

The cell assembly in the battery of the invention has a positive electrode, a negative electrode, and a separator situated therebetween.

The positive electrode is not subject to any particular limitation, although a positive electrode comprising a positive electrode current collector coated with a positive electrode solution containing a binder resin, a positive electrode active material, an electrically conductive material and a solvent is preferred.

The positive electrode current collector may be made of a suitable material such as stainless steel, aluminum, titanium, tantalum or nickel. Of these, aluminum is especially preferred both in terms of performance and cost. The current collector used may be in any of various forms, including foil, expanded metal, sheet, foam, wool, or a three-dimensional structure such as a net.

Illustrative binder resins include fluoropolymers such as polyvinylidene fluoride (PVDF), vinylidene fluoride-hexafluoropropylene copolymer, vinylidene fluoride-chlorotrifluoroethylene (CTFE) copolymer (P(VDF-CTFE)), vinylidene fluoride-hexafluoropropylene fluororubber, vinylidene fluoride-tetrafluoroethylene-hexafluoropropylene fluororubber and vinylidene fluoride-tetrafluoroethylene-perfluoro(alkyl vinyl ether) fluororubber; polypropylene oxide, polyethylene, polystyrene, polybutadiene, butyl rubber, nitrile rubber, styrene-butadiene rubber, propylene-butadiene rubber, polysulfide rubber, nitrocellulose, cyanoethyl cellulose and various latexes. Any one or combination of two or more of the above may be used. Of these, the use of a fluoropolymer of the same composition as that used in the separator is preferred for further enhancing adhesion between the separator and the electrodes.

The positive electrode active material is selected as appropriate for the electrode application, the type of battery and other considerations. For instance, examples of positive electrode active materials that are suitable for use in the positive electrode of a lithium secondary cell include group I metal compounds such as CuO, $Cu_2O$, $Ag_2O$, CuS and $CuSO_2$; group IV metal compounds such as TiS, $SiO_2$ and SnO; group V metal compounds such as $V_2O_5$, $V_6O_{13}$, $Vo_x$, $Nb_2O_5$, $Bi_2O_3$ and $Sb_2O_3$; group VI metal compounds such as $CrO_3$, $Cr_2O_3$, $MoO_3$, $MoS_2$, $WO_3$ and $SeO_2$; group VII metal compounds such as $MnO_2$ and $Mn_2O_4$; group VIII metal compounds such as $Fe_2O_3$, FeO, $Fe_3O_4$, $Ni_2O_3$, NiO and $CoO_2$; and conductive polymeric compounds such as polypyrrole, polyaniline, poly(p-phenylene), polyacetylene and polyacene.

Suitable positive electrode active materials that may be used in lithium ion secondary cells include chalcogen compounds capable of adsorbing and releasing lithium ions, and lithium ion-containing chalcogen compounds.

Examples of such chalcogen compounds capable of adsorbing and releasing lithium ions include $FeS_2$, $TiS_2$, $MoS_2$, $V_2O_5$, $V_6O_3$ and $MnO_2$.

Specific examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_2$ (wherein M is at least one metal element selected from among cobalt, manganese, titanium, chromium, vanadium, aluminum, tin, lead and zinc; $0.05 \leq x \leq 1.10$; and $0.5 \leq y \leq 1.0$).

Illustrative examples of the conductive material include carbon black, Ketjen black, acetylene black, carbon whiskers, carbon fibers, natural graphite, artificial graphite, titanium oxide, ruthenium oxide, and metallic fibers such as aluminum or nickel. Any one or combinations of two or more thereof may be used.

If necessary, a dispersant may be added. Suitable dispersants include polar solvents such as N-methyl-2-pyrrolidone (NMP), dimethylformamide, dimethylacetamide and dimethylsulfamide.

The positive electrode can be produced by blending together ordinary amounts of the above-described binder resin, positive electrode active material, conductive material and solvent to form a positive electrode solution, then coating the solution onto a positive electrode current collector.

No particular limitation is imposed on the method for shaping the positive electrode as a thin film. One advantageous technique is to form the dope to a uniform thickness on a positive electrode current collector such as aluminum foil by a suitable means such as roller coating with an applicator roll, screen coating, doctor blade coating, spin coating, bar coating or dip coating.

The negative electrode in the invention is also not subject to any particular limitation, although a negative electrode comprising a negative electrode current collector coated with a negative electrode solution containing a binder resin and a negative electrode active material is preferred. Binder resins suitable for use in the negative electrode include the same as those mentioned above for the positive electrode.

The negative electrode current collector may be made of a suitable material such as copper, stainless steel, titanium or nickel. Of these, copper is especially preferred both in terms of performance and cost. The current collector used may be in any of various forms, including foil, expanded metal, sheet, foam, wool, or a three-dimensional structure such as a net.

The negative electrode active material is selected as appropriate for the electrode application, the type of battery and other considerations. Materials suitable for use in the negative electrode of a lithium secondary cell, for example, include alkali metals, alkali metal alloys, carbon materials, and the same materials as mentioned above for the positive electrode active material.

Examples of suitable alkali metals include lithium, sodium and potassium. Examples of suitable alkali metal alloys include Li—Al, Li—Mg, Li—Al—Ni, Na, Na—Hg and Na—Zn.

Examples of suitable carbon materials include graphite, carbon black, coke, glassy carbon, carbon fibers, and sintered bodies obtained from any of these.

In a lithium ion secondary cell, use may be made of a material which reversibly holds and releases lithium ions. Suitable carbon materials capable of reversibly holding and releasing lithium ions include non-graphitizable carbon materials and graphite materials. Specific examples include pyrolytic carbon, coke (e.g., pitch coke, needle coke, petroleum coke), graphites, glassy carbons, fired organic polymeric materials (materials such as phenolic resins or furan resins that have been carbonized by firing at a suitable temperature), carbon fibers, and activated carbon. Use can also be made of materials capable of being reversibly doped with lithium ions, including polymers such as polyacetylene and polypyrrole, and oxides such as $SnO_2$.

The negative electrode in the invention can be produced by blending together ordinary amounts of the above-described binder resin, negative electrode active material, conductive material and solvent to form a negative electrode solution, then coating the solution onto a negative electrode current collector.

No particular limitation is imposed on the method for shaping the negative electrode as a thin film. One advantageous technique is to form the dope to a uniform thickness using a suitable means such as roller coating with an applicator roll, screen coating, doctor blade coating, spin coating, bar coating or dip coating.

The separator is composed primarily of a fluoropolymer. Illustrative examples of the fluoropolymer include polyvinylidene fluoride (PVDF), vinylidene fluoride-hexafluoropropylene (HFP) copolymer (P(VDF-HFP)), vinylidene fluoride-chlorotrifluoroethylene (CTFE) copolymer (P(VDF-CTFE)), vinylidene fluoride-hexafluoropropylene fluororubber (P(VDF-HFP)), vinylidene fluoride-tetrafluoroethylene-hexafluoropropylene fluororubber (P(VDF-TFE-HFP)) and vinylidene fluoride-tetrafluoroethylene-perfluoro(alkyl vinyl ether) fluororubber. The fluoropolymer has a vinylidene fluoride content of preferably at least 50 wt %, and most preferably at least 70 wt %. The upper limit in the vinylidene fluoride content of the fluoropolymer is preferably about 97 wt %. Of the above fluoropolymers, the use of polyvinylidene fluoride (PVDF), copolymers of vinylidene fluoride and hexafluoropropylene (P(VDF-HFP)), and copolymers of vinylidene fluoride and chlorotrifluoroethylene (P(VDF-CTFE)) is preferred. Using a copolymer as the fluoropolymer is advantageous both because a copolymer has a lower crystallinity, allowing easier impregnation by the electrolyte solution, and because a copolymer better retains the electrolyte solution. Either a high-swelling polymer or a low-swelling polymer such as PVDF may be used in the present invention.

The fluoropolymer typically has a weight-average molecular weight of at least 500,000, preferably from 500,000 to 2,000,000, and most preferably from 500,000 to 1,500,000. Too low a weight-average molecular weight may result in an excessive decline in physical strength, inviting perforation or tearing which can render the separator useless.

The fluoropolymer serving as the main component of the separator may have a filler added to it. Any suitable filler which forms together with the fluoropolymer a matrix having at the filler-polymer interfaces fine pores in which the electrolyte solution can be impregnated may be used without particular limitation. The filler may be either an inorganic or organic material, and can have a broad range of physical characteristics such as particle shape and size, density and surface state. Exemplary fillers include both inorganic powders such as various oxides, carbonates and sulfates (e.g., silicon dioxide, titanium oxide, aluminum oxide, zinc oxide, calcium carbonate, calcium sulfate, tin oxide, chromium oxide, iron oxide, magnesium oxide, magnesium carbonate and magnesium sulfate), carbides (e.g., silicon carbide, calcium carbide) and nitrides (e.g., silicon nitride, titanium nitride); and organic powders such as various types of polymer particles that do not form a compatible mixture with the fluoropolymer matrix.

No particular limitation is imposed on the particle size of the filler, although the particle size is preferably not more than 10 $\mu$m, more preferably from 0.005 to 1 $\mu$m, and most preferably from 0.01 to 0.8 μm. The amount in which the filler is added to the fluoropolymer varies depending on the type of fluoropolymer and the type of filler, although the addition of 5 to 100 parts by weight, and especially 30 to 100 parts by weight, of filler per 100 parts by weight of the fluoropolymer is preferred.

In the practice of the invention, production of the separator can be carried out by dissolving or dispersing the fluoropolymer and, if necessary, a filler in a solvent to form a slurry. The solvent may be suitably selected from among various solvents in which the fluoropolymer is soluble, although a solvent which has a high boiling point and a good stability is preferred for industrial purposes. Examples of such solvents that are suitable for use here include N,N-dimethylformamide (DMF), dimethylacetamide, N-methyl-2-pyrrolidone, acetone, methyl ethyl ketone (MEK) and methyl isobutyl ketone. The concentration of fluoropolymer in the solvent is preferably within a range of 5 to 25 wt %.

Alternatively, instead of adding a filler to the fluoropolymer, use may be made of a method in which a plasticizer is added to the fluoropolymer and the fluoropolymer/plasticizer mixture is formed into a film, following which the plasticizer is solvent-extracted from the film. Examples of plasticizers suitable for this purpose include dimethyl adipate, diisobutyl adipate, dibutyl adipate, di-2-ethylhexyl adipate, diisodecyl adipate, dibutyl diglycol adipate, di-2-ethylhexyl azelate, dimethyl sebacate, dibutyl sebacate, di-2-ethylhexyl sebacate, methyl acetyl ricinoleate, dimethyl phthalate, diethyl phthalate, dibutyl phthalate, diheptyl phthalate, di-2-ethylhexyl phthalate, di-n-octyl phthalate, diisodecyl phthalate, butyl benzyl phthalate, diisononyl phthalate and ethyl phthalyl ethyl glycolate. The use of dibutyl phthalate or dioctyl phthalate as the plasticizer is especially preferred on account of the ease with which these can be extracted following film formation. The amount of plasticizer added in this method is typically about 10 to 200 parts by weight per 100 parts by weight of the fluoropolymer.

The cell assembly in the polymer battery of the invention is assembled by placing the above-described separator between the above-described positive and negative electrodes. For example, production of the cell assembly may be carried out by placing a separator formed as a film between the positive electrode and the negative electrode, then applying pressure to unite the elements; by coating the separator in the form of a slurry onto the positive and negative electrodes, heat-curing the slurry, then stacking the positive electrode and negative electrode on top of each other; or by some other suitable method.

The polymer battery according to the present embodiment of the invention is manufactured by impregnating the cell assembly produced as described above with an electrolyte composition containing (A) an ion-conductive salt, (B) a solvent in which the ion-conductive salt is soluble and (C) a compound having at least two reactive double bonds per molecule, then reacting the component C compound to form a three-dimensional network structure.

The ion-conductive salt serving as above component A is not subject to any particular limitation so long as it can be used in conventional electrochemical devices. Illustrative examples include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $CH_3(C_2H_5)_3NBF_4$, $(C_4H_9)_4NClO_4$, $LiN(CF_3SO_2)_2$ and $(C_2H_5)_4NPF_6$. Any one or combinations of two or more of these may be used.

The amount of the ion-conductive salt incorporated as component A varies empirically according to a number of factors, including the type of ion-conductive salt used. The amount of ion-conductive salt included in the overall electrolyte composition is generally from 0.1 to 3 mol/L, and preferably from 0.5 to 2 mol/L. Too little ion-conductive salt results in a weak concentration of the ion conductor, which may make the electrical conductivity too low for practical purposes. On the other hand, salt deposition may occur if too much salt is used.

Illustrative examples of the solvent in which the ion-conductive salt is soluble and which serves as above component B include chain ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and solvents commonly used in electrochemical devices, such as water, alcohol solvents (e.g., methanol, ethanol, butanol, ethylene glycol, propylene glycol, diethylene glycol, 1,4-butanediol and glycerol), polyoxyalkylene polyols (e.g., polyethylene oxide, polypropylene oxide, polyoxyethylene-oxypropylene glycol and mixtures of two or more thereof), amide solvents (e.g., N-methylformamide, N,N-dimethylformamide, N-methylacetamide and N-methylpyrrolidinone), carbonate solvents (e.g., diethyl carbonate, dimethyl carbonate, ethylmethyl carbonate, propylene carbonate, ethylene carbonate, styrene carbonate), and imidazolidinone solvents (e.g., 1,3-dimethyl-2-imidazolidinone). These solvents may be used singly or as mixtures of two or more thereof.

The amount of the ion-conductive salt-dissolving solvent serving as component B is generally from 30 to 100 parts by weight, and preferably from 70 to 100 parts by weight, per 100 parts by weight of the electrolyte composition.

The compound having at least two reactive double bonds per molecule serving as component C is a compound which can be reacted to form a three-dimensional network structure, and which helps to improve adhesion, prevent electrolyte evaporation, increase battery safety, and enhance battery characteristics when held at a high temperature.

Illustrative examples of the reactive double bond-bearing compound serving as component C of the electrolyte composition include compounds having two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylolpropane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic or methacrylic group may be added. Examples of such compounds include acrylates and methacrylates such as glycidyl methacrylate, glycidyl acrylate, tetrahydrofurfuryl methacrylate, methoxydiethylene glycol methacrylate, methoxytriethylene glycol methacrylate and methoxypolyethylene glycol methacrylate (average molecular weight 200–1,200), as well as methacryloyl isocyanate, 2-hydroxymethylmethacrylic acid and N,N-dimethylaminoethylmethacrylic acid. Other reactive double bond-containing compounds may be added as well, such as acrylamides (e.g., N-methylolacrylamide, methylenebisacrylamide, diacetoneacrylamide), and vinyl compounds such as vinyloxazolines and vinylene carbonate.

To form a three-dimensional network structure, a compound having at least two reactive double bonds must be added. That is, a three-dimensional network structure cannot be formed using only a compound having but a single reactive double bond, such as methyl methacrylate. Some addition of a compound bearing at least two reactive double bonds is necessary.

Of the reactive double bond-bearing compounds described above, especially preferred reactive monomers include polyoxyalkylene component-bearing diesters of formula (1) below. The use of the latter in combination with a polyoxyalkylene component-bearing monoester compound of formula (2) below and a triester compound is recommended.

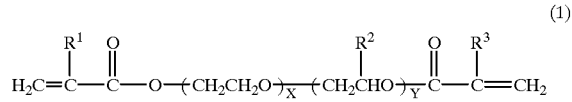
(1)

In formula (1), $R^1$, $R^2$ and $R^3$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^1$, $R^2$ and $R^3$ are most preferably methyl, ethyl, n-propyl, i-propyl, n-butyl, i-butyl, s-butyl or t-butyl.

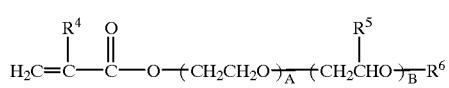
(2)

In formula (2), $R^4$, $R^5$ and $R^6$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^4$, $R^5$ and $R^6$ are most preferably methyl, ethyl, n-propyl, i-propyl, n-butyl, i-butyl, s-butyl or t-butyl.

Of these, diesters of formula (1) wherein X=9, Y=0, and $R^1=R^3=CH_3$ are preferred, and monoesters of formula (2) wherein A=2 or 9, B=0, and $R^4=R^6=CH_3$ are preferred.

Trimethylolpropane trimethacrylate is typical of the triester compound.

Typically, the polyoxyalkylene component-bearing diester and the polyoxyalkylene component-bearing monoester and the triester are heated or exposed to a suitable form of radiation (e.g., electron beam, microwave, or radio-frequency radiation) within the electrolyte composition, or a mixture of the diester and monoester is heated, to form a three-dimensional network structure.

A three-dimensional network structure can generally be formed by reacting only a polyoxyalkylene component-bearing diester and triester. However, as already noted, the addition of a polyoxyalkylene component-bearing monoester, which is a monofunctional monomer, to the diester and triester which are polyfunctional monomers is preferred, the reason being that such addition introduces polyoxyalkylene branched chains into the three-dimensional network.

Herein, the relative proportion of the polyoxyalkylene component-bearing diester, the polyoxyalkylene component-bearing monoester and the triester compound is not critical and may be determined as appropriate in accordance with the length of polyoxyalkylene component. It is preferred from the standpoint of gel strength enhancement that the weight ratio of diester compound to monoester compound fall within the range from 0.1 to 2, and especially from 0.3 to 1.5, and the weight ratio of diester compound to triester compound fall within the range from 2 to 15, and especially from 3 to 10.

The amount of the reactive double bond-bearing compound serving as component C is typically at least 1 wt %, and preferably from 5 to 40 wt %, of the overall electrolyte composition. Too little reactive double bond-bearing compound may fail to result in any increase in the film strength. On the other hand, too much component C compound may lower the solubility of the ion-conductive metal salt within the electrolyte composition, leading to salt deposition, a decline in film strength, and embrittlement of the film.

When the resulting electrolyte composition containing components A to C is placed between two copper sheets separated by a 200 μm gap and the ionic conductivity at 25° C. is measured by the AC impedance method, the composition generally has a ionic conductivity of at least $1 \times 10^{-4}$ S/cm, and preferably from $1 \times 10^{-4}$ to $7 \times 10^{-3}$ S/cm, which is fully adequate for the intended purpose.

The method of manufacturing the polymer battery of the present embodiment comprises the steps of:

(a) impregnating an electrolyte composition containing above-described components A to C into a cell assembly having a positive electrode, a negative electrode, and a separator disposed between the positive and negative electrodes that is composed primarily of a fluoropolymer; then (b) reacting or polymerizing the reactive double bond-bearing compound of component C by heating or exposure to a suitable form of radiation (e.g., electron beam, microwave, or radio-frequency radiation) so as to form a three-dimensional network structure.

Herein, the three-dimensional network structure can be formed by a polymerization reaction, and primarily a radical polymerization reaction. The polymerization reaction may be carried out without the addition of a polymerization initiator (also referred to below as a "catalyst") when electron beam irradiation is used, although an initiator is ordinarily added in other cases.

No particular limitation is imposed on the polymerization initiator, or catalyst. Examples of photopolymerization initiators that may be used include acetophenone, trichloroacetophenone, 2-hydroxy-2-methylpropiophenone, 2-hydroxy-2-methylisopropiophenone, 1-hydroxycyclohexylketone, benzoin ether, 2,2-diethoxyacetophenone and benzyl dimethyl ketal.

Examples of thermal polymerization initiators that may be used include high-temperature initiators such as cumene hydroperoxide, t-butyl hydroperoxide, dicumyl peroxide and di-t-butylperoxide; conventional initiators such as benzoyl peroxide, lauroyl peroxide, persulfates and azobisisobutyronitrile; low-temperature initiators (redox initiators) such as hydrogen peroxide-ferrous salts, persulfate-acidic sodium sulfite, cumene hydroperoxide-ferrous salts and benzoyl peroxide-dimethylaniline; and also peroxide-organometallic alkyls, triethylboron, diethylzinc, and oxygen-organometallic alkyls.

These polymerization initiators may be used alone or as mixtures of two or more thereof. The initiator, or catalyst, for the radical polymerization reaction is added in an amount within a range of preferably 0.1 to 1 part by weight, and especially 0.1 to 0.5 part by weight, per 100 parts by weight of the compound having at least two reactive double bonds per molecule (component C). The addition of less than 0.1 part by weight results in a marked decline in the polymerization rate, whereas the addition of more than 1 part by weight does not further enhance the catalytic effects and thus amounts merely to a wasteful use of reagent.

Polymerization by means of e-beam irradiation is carried out at room temperature and an acceleration voltage of 150 to 300 kV. In the case of thermal polymerization, the reaction is effected by heating at 50 to 120° C. for a period of 0.5 to 6 hours.

In light of such considerations as the simplicity of the apparatus and running costs, it is preferable for the polymerization reaction to be carried out by a thermal polymerization process.

Figure 4:
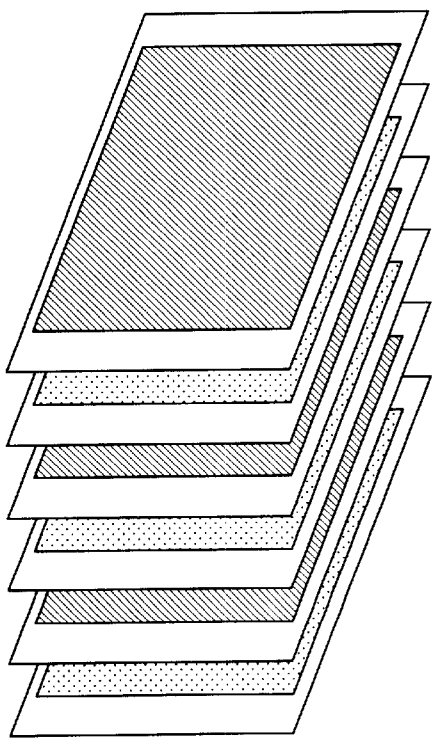
FIG. 4 is a perspective view of a stacked polymer battery.
Figure 5:
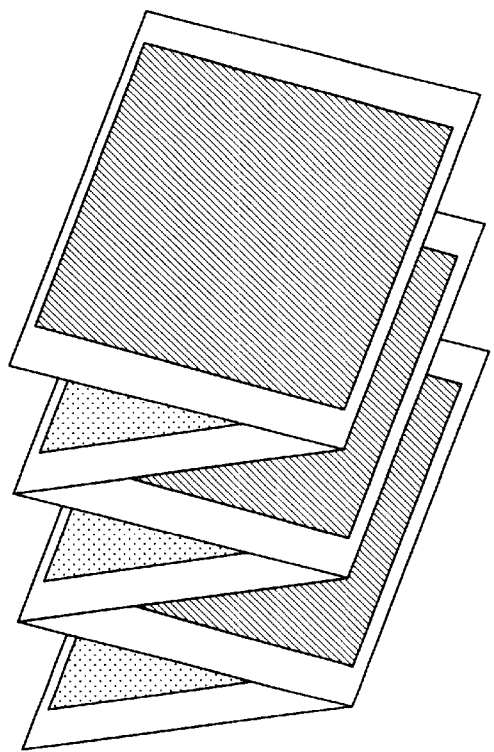
FIG. 5 is a perspective view of a fan-folded polymer battery.
Figure 6:
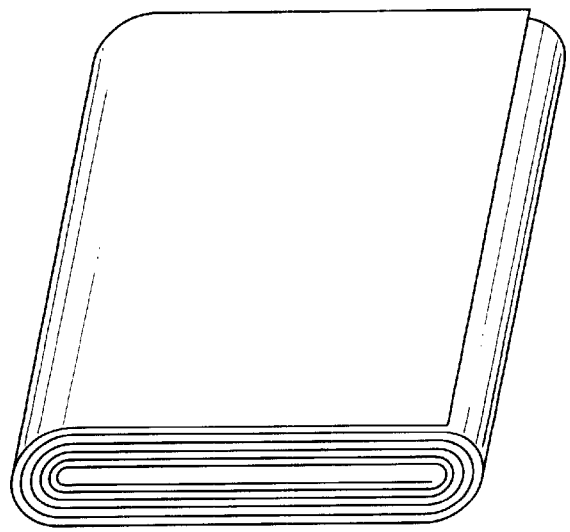
FIG. 6 is a perspective view of a coiled polymer battery.
Figure 7:
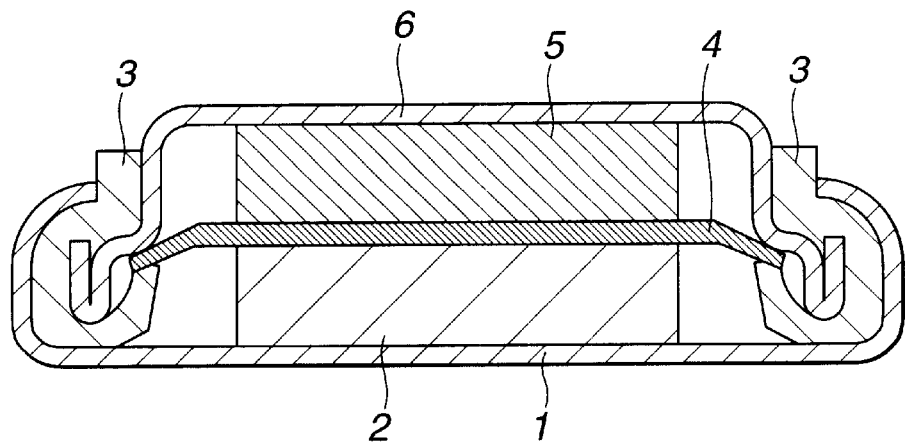
FIG. 7 is a cross-sectional view of a coin-type polymer battery.

The polymer battery of the present embodiment of the invention is assembled by stacking (see FIG. 4), fan-folding (FIG. 5) or winding (FIG. 6) the cell assembly and inserting it in an aluminum laminate bag or a metal case, or by forming it into a coin-like shape (FIG. 7) and placing it in a battery housing such as a battery can or a laminate pack. The cell assembly is then filled with an amount of electrolyte composition sufficient to fully impregnate the positive and negative electrodes and the separator. Finally, the battery enclosure is mechanically sealed if it is a can, or heat-sealed if it is a laminate pack. The coin cell shown in FIG. 7 has a case 1, a first electrode 2, a second electrode 5, a gasket 3, a separator 4, and a cap 6.

The resulting polymer battery according to the first embodiment of the invention has a high safety, good heat cycling resistance, and robust characteristics even when held at a high temperature. These features make it particularly well suited for use as a lithium secondary cell or a lithium ion secondary cell.

Second Embodiment of the Invention

The polymer battery according to a second embodiment of the invention includes a cell assembly having a positive electrode, a negative electrode, and a separator disposed between the positive and negative electrodes that is composed primarily of a fluoropolymer. The battery is made by impregnating the cell assembly with an electrolyte composition containing (A) an ion-conductive salt, (B) a solvent in which the ion-conductive salt is soluble, (C) a compound having at least two reactive double bonds per molecule and (D) a hydroxyalkyl polysaccharide derivative, then forming a semi-interpenetrating polymer network structure in which molecular chains on the component D polymer are interlocked with a three-dimensional polymer network structure obtained by crosslinking the component C compound.

The cell assembly and components A to C used in this embodiment are the same as those described above for the first embodiment of the invention.

The hydroxyalkyl polysaccharide derivative serving as component D helps to create a firm semi-interpenetrating polymer network (semi-IPN) structure in which the highly branched molecular chains of the hydroxyalkyl polysaccharide derivative are interlocked with a three-dimensional network structure formed by reacting the reactive double bond-bearing compound of component C. This semi-IPN structure enhances the compatibility between the different types of polymer chains and also increases bond strength between the chains, thus improving adhesion, lowering the rate of electrolyte evaporation and providing better shape retention.

Any of the following may be used as the hydroxyalkyl polysaccharide derivative serving as component D:

(1) hydroxyethyl polysaccharides prepared by reacting ethylene oxide with a naturally occurring polysaccharide such as cellulose or starch;
(2) hydroxypropyl polysaccharides prepared by similarly reacting instead propylene oxide;
(3) dihydroxypropyl polysaccharides prepared by similarly reacting instead glycidol or 3-chloro-1,2-propanediol.

Some or all of the hydroxyl groups on these hydroxyalkyl polysaccharides may be capped with an ester-bonded or ether-bonded substituent.

Illustrative examples of such polysaccharides include cellulose, starch, amylose, amylopectin, pullulan, curdlan, mannan, glucomannan, arabinan, chitin, chitosan, alginic acid, carrageenan and dextran. The polysaccharide is not subject to any particular limitations with regard to molecular weight, the presence or absence of a branched structure, the type and arrangement of constituent sugars in the polysaccharide and other characteristics. The use of cellulose or starch is especially preferred, in part because of their ready availability.

A method for synthesizing dihydroxypropyl cellulose is described in U.S. Pat. No. 4,096,326. Other dihydroxypropyl polysaccharides can be synthesized by known methods, such as those described by Sato et al. in *Makromol. Chem.* 193, p. 647 (1992) or in *Macromolecules* 24, p. 4691 (1991).

The hydroxyalkyl polysaccharide used in the invention has a molar degree of substitution of preferably at least 2. At a molar substitution below 2, the ability to dissolve ion-conductive metal salts becomes so low as to make use of the hydroxyalkyl polysaccharide impossible. The upper limit in the molar substitution is preferably 30, and more preferably 20. The industrial synthesis of hydroxyalkyl polysaccharides having a molar substitution greater than 30 can be difficult on account of production costs and the complexity of the synthesis operations. Moreover, even if one does go to the extra trouble of producing hydroxyalkyl polysaccharide having a molar substitution greater than 30, the increase in electrical conductivity resulting from the higher molar substitution is not likely to be very large.

The hydroxyalkyl polysaccharide derivative used as component D in the practice of the invention is one in which at least 10% of the terminal OH groups on the molecular chains of the above described hydroxyalkyl polysaccharide have been capped with one or more monovalent groups selected from among halogen atoms, substituted or unsubstituted monovalent hydrocarbon groups, $R^7CO$— groups (wherein $R^7$ is a substituted or unsubstituted monovalent hydrocarbon group), $R^7{}_3Si$— groups (wherein $R^7$ is the same as above), amino groups, alkylamino groups, $H(OR^8)_m$— groups (wherein $R^8$ is an alkylene group of 2 to 4 carbons, and the letter m is an integer from 1 to 100), and phosphorus-containing groups.

The purpose of capping the OH groups on the hydroxyalkyl polysaccharide with the above groups is two-fold: (1) to increase the dielectric constant of the hydroxyalkyl polysaccharide by introducing polar groups, and (2) to impart outstanding properties such as hydrophobic properties and fire retardance to the hydroxyalkyl polysaccharide.

To increase the dielectric constant of the hydroxyalkyl polysaccharide according to the first of these aims, the hydroxyalkyl polysaccharide is reacted with a hydroxy-reactive compound so as to cap the hydroxyl end groups on the molecular chains of the hydroxyalkyl polysaccharide with highly polar substituents.

Although the highly polar substituents used for this purpose are not subject to any particular limitation, neutral substituents are preferable to ionic substituents. Exemplary substituents include substituted and unsubstituted monovalent hydrocarbon groups, $R^7CO$— groups (wherein $R^7$ is a substituted or unsubstituted monovalent hydrocarbon group), and $H(OR^8)_m$— groups (wherein $R^8$ is an alkylene group of 2 to 4 carbons, and m is an integer from 1 to 100). If necessary, capping may also be carried out with other suitable substituents, such as amino groups or alkylamino groups.

The second purpose of capping mentioned above, which is to confer the hydroxyalkyl polysaccharide with hydrophobic properties and fire retardance, can be achieved by the use of, for example, halogen atoms, $R^7{}_3Si$— groups (wherein $R^7$ is the same as above) or phosphorus-containing groups to cap the hydroxyl end groups on the molecular chains of the hydroxyalkyl polysaccharide.

Examples of halogen atoms that may be used as the substituents here include fluorine, bromine and chlorine. Exemplary substituted or unsubstituted monovalent hydrocarbon groups which may be used as the capping substituents are substituted or unsubstituted monovalent hydrocarbon groups having 1 to 10 carbons, and preferably 1 to 8 carbons, including alkyls such as methyl, ethyl, propyl, isopropyl, butyl, isobutyl, tert-butyl, pentyl, neopentyl, hexyl, cyclohexyl, octyl, nonyl and decyl; aryls such as phenyl, tolyl and xylyl; aralkyls such as benzyl, phenylethyl and phenylpropyl; alkenyls such as vinyl, allyl, propenyl, isopropenyl, butenyl, hexenyl, cyclohexenyl and octenyl; and any of these groups in which some or all of the hydrogen atoms are substituted with, for example, halogen atoms (e.g., fluorine, bromine, chlorine), cyano groups, hydroxyl groups, $H(OR^8)_m$— groups (wherein $R^8$ is an alkylene of 2 to 4 carbons, and m is an integer from 1 to 100), amino groups, aminoalkyl groups or phosphono groups, such as cyanoethyl, cyanobenzyl and other cyano-group bearing alkyls, chloromethyl, chloropropyl, bromoethyl and trifluoropropyl. Any one or combinations of two or more of these substituents may be used.

Examples of suitable $R^7CO$— groups include those in which $R^7$ represents the same substituted or unsubstituted monovalent hydrocarbon groups having 1 to 10 carbons, and preferably 1 to 8 carbons, as above. $R^7$ preferably stands for an alkyl group or a phenyl group. Acyl groups, benzoyl and cyanobenzoyl are especially preferred.

Exemplary $H(OR^8)_m$— groups are those in which $R^8$ is an alkylene of 2 to 4 carbons, such as ethylene, propylene or butylene, and m is an integer from 1 to 100, and preferably from 2 to 70. Two or more different groups from among ethyleneoxy, propyleneoxy and butyleneoxy may be present.

Examples of suitable $R^7{}_3Si$— groups include those in which $R^7$ represents the same substituted or unsubstituted monovalent hydrocarbon groups having 1 to 10 carbons, and preferably 1 to 8 carbons, as above. $R^7$ preferably stands for alkyl groups. Trialkylsilyl groups, and especially trimethylsilyl, are preferred.

Additional examples of suitable substituents include amino groups, alkylamino groups and phosphorus-containing groups.

The proportion of end groups capped with the above substituents is at least 10 mol %, preferably at least 50 mol %, and most preferably at least 90 mol %. It is even possible to cap substantially all the end groups with the above substituents, representing a capping ratio of essentially 100 mol %.

However, because there are cases in which the ability of the hydroxyalkyl polysaccharide itself to dissolve the ion-conductive salt decreases when all the hydroxyl end groups on the molecular chains of the polysaccharide are capped with halogen atoms, $R^7{}_3Si$— groups or phosphorus-containing groups, it is essential to introduce a suitable amount of substituent while taking into consideration the solvating properties of the polysaccharide. This amount, based on the total number of hydroxyl end groups, is preferably 10 to 95 mol %, more preferably 50 to 95 mol %, and most preferably 50 to 90 mol %.

The substituent used in the practice of the invention is most preferably a cyano group-substituted monovalent hydrocarbon group or both a cyano group-substituted monovalent hydrocarbon group and a $R^7{}_3Si$— group. Illustrative examples include cyanoethyl, cyanobenzyl, cyanobenzoyl, and other alkyl groups to which a cyano group is attached, or a combination of any of these cyano group-substituted monovalent hydrocarbon groups with trimethylsilyl, for instance.

When a cyano group-substituted monovalent hydrocarbon group such as cyanoethyl is used in combination with a $R^7{}_3Si$— group such as trimethylsilyl, the two components are used in respective proportions of preferably 70 to 97 mol %, and especially 90 to 97 mol %, of the cyano group-substituted monovalent hydrocarbon groups, and preferably 3 to 30 mol %, and especially 3 to 10 mol %, of the $R^7{}_3Si$— groups, based on all the hydroxyl end groups on the molecular chains. Hydroxyalkyl polysaccharides in which cyano group-substituted monovalent hydrocarbon groups and $R^7{}_3Si$— groups have been incorporated together in this way possess excellent electrical conductivity and hydrophobic properties.

When cyanoethyl groups are introduced as the substituent, the method for capping the molecular chains of the hydroxyalkyl polysaccharide with such substituents may comprise, for example, mixing hydroxypropyl cellulose with dioxane and acrylonitrile, adding a sodium hydroxide solution to the mixture, and stirring to effect the reaction. This yields a cyanoethylated hydroxypropyl cellulose in which cyanoethyl groups have been introduced onto some or all of the side chains.

In cases where acetyl groups are introduced as the substituent, this may be carried out by, for example, mixing hydroxypropyl cellulose with acetic acid and methylene chloride, adding aqueous perchloric acid and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated hydroxypropyl cellulose.

Cyanobenzoyl groups may be introduced as the substituent by a method which involves, for example, mixing hydroxypropyl cellulose with dioxane, adding pyridine, then adding dropwise a solution of cyanobenzoyl chloride in dioxane. Next, the resulting solution is reacted at a given temperature, after which the reaction mixture is poured into a methanol/water (3:4) solution. The precipitate that forms is collected and dissolved in N,N-dimethylsulfoxide, following which the solution is placed in dialysis tubing and dialyzed. The resulting precipitate is collected, rinsed with water, then dried in vacuo, giving a cyanobenzoylated hydroxypropyl cellulose.

The introduction of trimethylsilyl groups may be carried out by dissolving, for example, hydroxypropyl cellulose in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated hydroxypropyl cellulose.

Capping with other suitable substituents may likewise be carried out using known techniques for introducing those substituents onto hydroxyl end groups.

The hydroxyalkyl polysaccharide derivative serving as component D of the electrolyte composition is typically included in an amount of 0.5 to 30 wt %, and preferably 1 to 20 wt %, based on the overall electrolyte composition. Too much component D tends to result in an excessive rise in the viscosity of the composition, which may make it difficult for the composition to penetrate into the fluoropolymer separator. On the other hand, too little component D may lower the closeness and tightness of adhesion as well as the strength, reduce the safety of the battery, and diminish its properties when held at a high temperature.

When the resulting electrolyte composition containing components A to D and in which components C and D together form a semi-IPN structure is placed between two copper sheets separated by a 200 μm gap and the ionic conductivity at 25° C. is measured by the AC impedance method, the composition generally has an ionic conductivity of $1 \times 10^{-4}$ to $7 \times 10^{-3}$ S/cm, which is fully adequate for the intended purpose.

In the practice of the invention, the ratio $(C_1/C_2) \times 100$ is from 80 to 100%, and preferably from 90 to 100%, provided that $C_1$ is the ionic conductivity (S/cm) of an electrolyte composition which contains components A to D and in which components C and D together form a semi-interpenetrating polymer network structure and $C_2$ is the ionic conductivity (S/cm) of an electrolyte composition which contains components A, B and C or components A, B and D and does not have a semi-IPN structure.

By including components A to D and having components C and D form a semi-IPN structure, the physical properties (e.g., strength, elongation, bond strength) of the resulting electrolyte composition are greatly improved over those of electrolyte compositions composed only of components A to C or components A, B and D, yet formation of the semi-IPN structure may decrease ion mobility within the matrix, lowering ionic conductivity. This is why a combination which makes the ratio $(C_1/C_2) \times 100$ as high as possible is preferred. Hence, the individual components should be selected so that the ratio $(C_1/C_2) \times 100$ falls within the above range.

Even if the conductivity $C_1$ of an electrolyte composition which contains components A to D and in which components C and D together form a semi-IPN structure is smaller than the ionic conductivity $C_2$ of an electrolyte composition which contains components A to C or components A, B and D and does not have a semi-IPN structure, the difference is quite small. Thus, the electrolyte composition containing components A to D and having a semi-IPN structure is endowed with an ion-conducting ability that is fully adequate for its use as an electrolyte composition in a polymer battery.

The method of manufacturing the polymer battery of the second embodiment of the invention comprises the steps of:

(a) impregnating an electrolyte composition containing above-described components A to D into a cell assembly having a positive electrode, a negative electrode, and a separator disposed between the positive and negative electrodes that is composed primarily of a fluoropolymer; then (b) forming a semi-IPN structure in which molecular chains on the polysaccharide derivative of component D are interlocked with a three-dimensional polymer network structure obtained by heating or exposing the component C compound to a suitable form of radiation (e.g., electron beam, microwave, or radio-frequency radiation) so as to effect crosslinking. The method of polymerization used for this purpose is the same as that described above for the first embodiment of the invention.

The polymer battery of the present embodiment is assembled by stacking (FIG. 4), fan-folding (FIG. 5) or winding (FIG. 6) the cell assembly and inserting it in an aluminum laminate bag or a metal case, or by forming it into a coin-like shape (FIG. 7) and placing it in a battery housing such as a battery can or a laminate pack. The cell assembly is then filled with an amount of the electrolyte composition sufficient to fully impregnate the positive and negative electrodes and the separator. Finally, the battery enclosure is mechanically sealed if it is a can, or heat-sealed if it is a laminate pack. The coin cell shown in FIG. 7 has a case 1, a first electrode 2, a second electrode 5, a gasket 3, a separator 4, and a cap 6.

The resulting polymer battery according to the second embodiment of the invention has a high safety, good heat cycling resistance, and robust characteristics even when held at a high temperature. These features make it particularly well suited for use as a lithium secondary cell or a lithium ion secondary cell.

Third Embodiment of the Invention

The polymer battery according to a third embodiment of the invention includes a cell assembly having a positive electrode, a negative electrode, and a separator disposed between the positive and negative electrodes that is composed primarily of a fluoropolymer. The battery is made by impregnating the cell assembly with an electrolyte composition containing (A) an ion-conductive salt, (B) a solvent in which the ion-conductive salt is soluble, (C) a compound having at least two reactive double bonds per molecule, and (E) a polyvinyl alcohol derivative, then forming a semi-interpenetrating polymer network structure in which molecular chains on the component E polymer are interlocked with a three-dimensional polymer network structure obtained by crosslinking the component C compound.

The cell assembly and components A to C used in this embodiment are the same as those described above for the first embodiment of the invention.

The polyvinyl alcohol derivative serving as component E helps to create a firm semi-IPN structure in which the polyvinyl alcohol derivative are interlocked with a three-dimensional network structure formed by reacting the reactive double bond-bearing compound of component C. This semi-IPN structure enhances the compatibility between the different types of polymer chains and also increases bond strength between the chains, thus improving adhesion, lowering the rate of electrolyte evaporation and providing better shape retention.

In this invention, two types of the polyvinyl alcohol (PVA) derivatives as component E can be used. The first PVA-derivative is a polymeric compound in which some or all of hydroxyl groups on the polyvinyl alcohol units are substituted with oxyalkylene-containing groups. The second type of PVA-derivative is a polymeric compound in which some or all of hydroxyl groups on the polyvinyl alcohol units are substituted with both oxyalkylene-containing groups and cyano-substituted monovalent hydrocarbon groups.

The polyvinyl alcohol derivative of the first type serving as component E is a polymeric compound which contains polyvinyl alcohol units and has an average degree of polymerization of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and especially no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

These polyvinyl alcohol units make up the backbone of the polyvinyl alcohol derivative and have the following general formula (3)

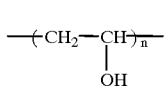

(3)

In formula (3), the letter n is at least 20, preferably at least 30, and most preferably at least 50. The upper limit for n is preferably no higher than 2,000, and most preferably no higher than 200.

It is highly advantageous for the polyvinyl alcohol unit-containing polymeric compound to be a homopolymer which satisfies the above range in the average degree of polymerization and in which the fraction of polyvinyl alcohol units in the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, poly(ethylene vinyl alcohol), partially saponified polyvinyl acetate, and other modified polyvinyl alcohols.

Some or all of the hydroxyl groups on the polyvinyl alcohol units of the polymeric compound serving as component E are substituted with oxyalkylene-containing groups (moreover, some of the hydrogen atoms on these oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of polyvinyl alcohol (PVA) is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the -OH groups on the original —(CH$_2$CH(OH))— units have become —O—(CH$_2$CH$_2$O)— groups, and so the unit molecular weight of the reaction product is 44+44n. Because the increase in weight associated with the reaction is represented by 44n, the calculation is carried out as follows.

$$\frac{\text{PVA}}{\text{PVA deriviative}} = \frac{44}{44+44n} = \frac{10 \text{ g}}{15 \text{ g}}$$

$$440 + 440n = 660$$

$$n = 0.5$$

Hence, the molar substitution in this example is 0.5. Of course, this value merely represents the average molar substitution and does give any indication of, for example, the number of unreacted PVA units on the molecule or the length of the oxyethylene groups introduced onto the PVA by the reaction.

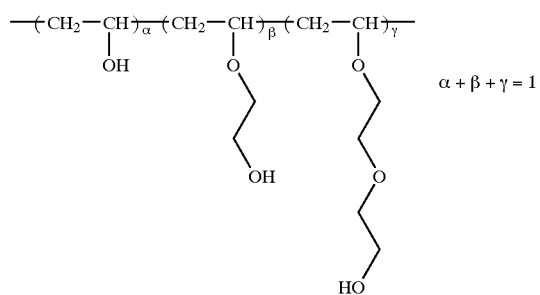

Molar sustitution:
MS = 0 unit    MS = 1 unit    MS = 2 units $$\text{Average } MS = \frac{0+1+2}{3} = 1$$

Suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent at the end.

A variety of well-known methods may be employed for introducing cyano-substituted monovalent hydrocarbon groups onto the above polyvinyl alcohol unit-containing polymeric compound. For example, a method similar to the above-described method of blocking hydroxyalkyl polysaccharides with cyanoethyl or cyanobenzoyl groups is employable.

In above method (1), the oxirane compound may be any one or combination selected from among ethylene oxide, propylene oxide and glycidol.

If ethylene oxide is reacted in this case, oxyethylene chains are introduced onto the polymeric compound as shown in the following formula.

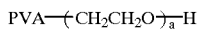

In the formula, "a" is preferably from 1 to 10, and most preferably from 1 to 5.

If propylene oxide is reacted instead, oxypropylene chains are introduced onto the polymeric compound as shown below.

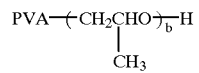

In the formula, "b" is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: a-attack or b-attack. The reaction of one glycidol molecule creates two new hydroxyl groups, each of which can in turn react with glycidol. As a result, the two following branched chains (1) and (2) are introduced onto the hydroxyl groups of the PVA units.

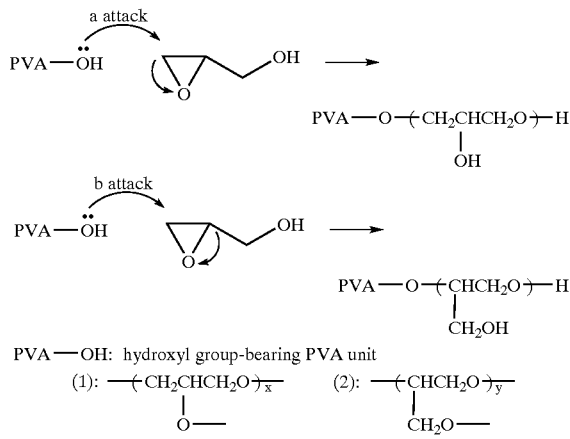

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described for the purpose of illustration. First, the reaction vessel is charged with a solvent and polyvinyl alcohol. It is not essential in this case for the polyvinyl alcohol to dissolve in the solvent. That is, the polyvinyl alcohol may be present in the solvent either in a uniformly dissolved state or in a suspended state. A given amount of a basic catalyst, such as aqueous sodium hydroxide, is added and stirred for a while into the solution or suspension, following which glycidol diluted with a solvent is added. Reaction is carried out at a given temperature for a given length of time, after which the polyvinyl alcohol is removed. If the polyvinyl alcohol is present within the reaction mixture in undissolved form, it is separated off by filtration using a glass filter, for example. If, on the other hand, the polyvinyl alcohol is dissolved within the reaction mixture, it is precipitated out of solution by pouring an alcohol or other suitable precipitating agent into the reaction mixture, following which the precipitate is separated off using a glass filter or the like. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (4) below.

(4)

In formula (4), the letter A represents a monovalent substituent having reactivity with hydroxyl groups. Illustrative examples include isocyanate groups, epoxy groups, carboxyl groups, acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and acid chloride groups are preferred on account of their reactivity.

The carboxyl group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as isocyanate or epoxy, may be bonded directly to the oxyalkylene group $R^9O$ or through, for example, an intervening oxygen atom, sulfur atom, carbonyl group, carbonyloxy group, nitrogenous group (e.g., NH—, N(CH$_3$)—, N(C$_2$H$_5$)—) or SO$_2$ group. Preferably, the hydroxy-reactive group is bonded to the oxyalkylene group $R^9O$ through, for example, an alkylene, alkenylene or arylene group having 1 to 10 carbons, and especially 1 to 6 carbons.

Examples of polyoxyalkylene groups bearing this type of substituent A that may be used are the products obtained by reacting polyisocyanate compounds at the hydroxyl end group on a polyoxyalkylene group. Isocyanate group-bearing compounds that may be used in this case include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds such as may be obtained from the following reaction.

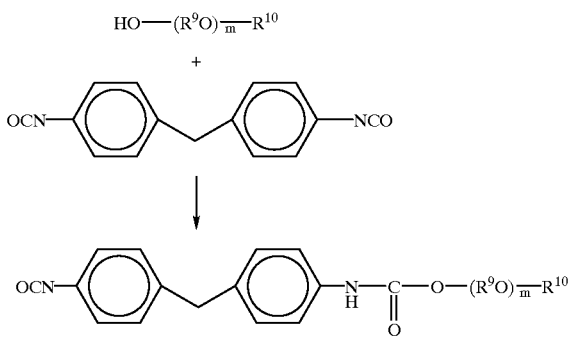

In the formula, $R^9O$ is an oxyalkylene group of 2 to 5 carbons, examples of which include —$CH_2CH_2O$—, —$CH_2CH_2CH_2O$—, —$CH_2CH(CH_3)O$—, —$CH_2CH(CH_2CH_3)O$— and —$CH_2CH_2CH_2CH_2O$—. The letter m represents the number of moles of the oxyalkylene group that are added. This number of added moles (m) is preferably from 1 to 100, and most preferably from 1 to 50.

Here, the polyoxyalkylene chain represented by the above formula $(R^9O)_m$ is most preferably a polyethylene glycol chain, a polypropylene glycol chain or a polyethylene oxide (EO)/polypropylene oxide (PO) copolymer chain. The weight-average molecular weight of these polyoxyalkylene chains is preferably from 100 to 3,000, and most preferably within the weight-average molecular weight range of 200 to 1,000 at which the compound is liquid at room temperature.

$R^{10}$ in the above formula is a capping moiety for one end of the chain. This represents a hydrogen atom, a substituted or unsubstituted monovalent hydrocarbon group having 1 to 10 carbons, or a $R^{11}CO$— group (wherein $R^{11}$ is a substituted or unsubstituted monovalent hydrocarbon group having 1 to 10 carbons).

Illustrative examples of the substituted or unsubstituted monovalent hydrocarbon groups having 1 to 10 carbons that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted groups in which some or all of the hydrogen atoms on the above groups have been substituted with halogen atoms such as fluorine, bromine or chlorine, cyano, hydroxyl, $H(OR^8)_z$— (wherein $R^8$ is an alkylene having 2 to 4 carbons, and z is an integer from 1 to 100), amino, aminoalkyl or phosphono. Specific examples of such substituted groups include cyanoethyl, cyanobenzyl, substituted groups in which cyano is bonded to other alkyl groups, chloromethyl, chloropropyl, bromoethyl and trifluoropropyl. These may be used alone or as combinations of two or more thereof. The monovalent hydrocarbon group preferably has from 1 to 8 carbons.

Illustrative examples of $R^{11}CO$— groups that may be used as the capping moiety include those in which $R^{11}$ is a substituted or unsubstituted monovalent hydrocarbon group having 1 to 10 carbons. Preferred examples of $R^{11}$ include alkyl or phenyl groups which may be substituted with cyano, acyl groups, benzoyl groups and cyanobenzoyl groups.

The reaction in method (2) between the above-described polyvinyl alcohol unit-containing polymeric compound and the above-described polyoxyalkylene compound having a hydroxy-reactive substituent at the end may be carried out in the same manner as the reaction carried out with an oxirane compound in method (1).

In the reaction, the molar ratio between the polyvinyl alcohol and the polyoxyalkylene compound having a hydroxy-reactive substituent at the end is preferably from 1:1 to 1:20, and most preferably from 1:1 to 1:10.

The structure of the polymeric compound of the invention in which oxyalkylene-containing groups or cyano-substituted monovalent hydrocarbon groups have been introduced onto polyvinyl alcohol units can be verified by $^{13}$C-NMR spectroscopy. For example, as shown in FIG. 1, the $^{13}$C-NMR spectrum (DEPT spectrum measured using a Varian VXR-300 NMR spectrometer, with $D_2O$ as the solvent) of dihydroxypropylated polyvinyl alcohol prepared by reacting polyvinyl alcohol with glycidol includes peaks originating from the polyvinyl alcohol and peaks for dihydroxypropyl groups from the glycidol.

The extent to which the polymeric compound containing oxyalkylene chain-bearing or cyano-substituted monovalent hydrocarbon chain-bearing polyvinyl alcohol units serving as component E in the invention contains oxyalkylene groups or cyano-substituted monovalent hydrocarbon groups can be determined in this case using various analytical techniques such as NMR or elemental analysis, although a method of determination based on the weight of the polymer charged as a reactant and the increase in weight of the polymer formed by the reaction is simple and convenient. For example, determination from the yield may be carried out by precisely measuring both the weight of the polyvinyl alcohol unit-containing polymeric compound charged into the reaction and the weight of the polymeric compound containing oxyalkylene group-bearing or cyano-substituted monovalent hydrocarbon group-bearing polyvinyl alcohol units obtained from the reaction, then using this difference to calculate the quantity of oxyalkylene chains or cyano-substituted monovalent hydrocarbon chains that have been introduced onto the molecule (referred to hereinafter as the average molar substitution, or "MS").

The average molar substitution serves here as an indicator of the number of moles of oxyalkylene groups or cyano-substituted monovalent hydrocarbon groups that have been introduced onto the molecule per polyvinyl alcohol unit. In the polymeric compound having oxyalkylene groups introduced therein, the average molar substitution must be at least 0.3, and is preferably at least 0.5, more preferably at least 0.7 and most preferably at least 1.0. No particular upper limit is imposed on the average molar substitution, although a value not higher than 20 is preferred. Too low an average molar substitution may result in a failure of the ion-conductive salt to dissolve, lower ion mobility and lower ionic conductivity. On the other hand, increasing the average molar substitution beyond a certain level fails to yield any further change in the solubility of the ion-conductive salt or ion mobility and is thus pointless.

In the polymeric compound having cyano-substituted monovalent hydrocarbon groups introduced therein, the percent substitution is preferably at least 70 mol %, more preferably at least 90 mol % and most preferably at least 95 mol %, as previously mentioned. Too low an average molar substitution may result in the risk of lower ion mobility and lower ionic conductivity because the polyvinyl alcohol itself has a low dielectric constant. Since more contents of hydroxyl groups can lead to the risk of hydrogen desorption in high-voltage battery systems, a higher substitution is preferred.

Depending on its average degree of polymerization, the polyvinyl alcohol unit-containing polymeric compound used as component E varies in appearance at room temperature (20° C.) from a highly viscous molasses-like liquid to a rubbery solid. The higher the molecular weight, the more it qualifies as a solid (albeit a soft, paste-like solid) with its low fluidity at room temperature.

The polymeric compound serving as component E, regardless of its average degree of polymerization, is not a linear polymer, but rather an amorphous polymer due to the interlocking of its highly branched molecular chains.

The polyvinyl alcohol derivative used as component E in the present invention can be prepared by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituents selected from among halogen atoms, substituted or unsubstituted monovalent hydrocarbon groups having 1 to 10 carbons, $R^7CO-$ groups (wherein $R^7$ is a substituted or unsubstituted monovalent hydrocarbon group of 1 to 10 carbons), $R^7_3Si-$ groups ($R^7$ being as defined above), amino groups, alkylamino groups and phosphorus-containing groups.

The purpose of capping the hydroxyl groups on the oxyalkylene chain-bearing polyvinyl alcohol unit-containing polymeric compound with the above substituents is two-fold.

(1) In a polymer containing a high concentration of ion-conductive salt, dissociated cations and counter ions (anions) will readily recombine in a low-dielectric-constant polymer matrix, lowering the conductivity. Because raising the polarity of the polymer matrix discourages ion association, one aim is to increase the dielectric constant of the matrix polymer by introducing polar groups at the hydroxyl groups on the oxyalkylene chain-bearing polyvinyl alcohol unit-containing polymeric compound.

(2) The second aim is to impart the polymeric compound with highly desirable characteristics, such as hydrophobic properties and fire retardance.

To increase the dielectric constant of the polymeric compound according to the first of these aims, the oxyalkylene chain-bearing polyvinyl alcohol unit-containing polymeric compound is reacted with a hydroxy-reactive compound so as to cap the hydroxyl groups on the polymeric compound with highly polar substituents.

Although the highly polar substituents used for this purpose are not subject to any particular limitation, neutral substituents such as substituted or unsubstituted monovalent hydrocarbon groups having 1 to 10 carbons or $R^7CO-$ groups (wherein $R^7$ is as defined above) are preferable to ionic substituents. If necessary, capping may also be carried out with other suitable substituents, such as amino groups and alkylamino groups.

The second purpose of capping mentioned above, which is to confer the polymeric compound with hydrophobic properties and fire retardance, can be achieved by the use of, for example, halogen atoms, $R^7_3Si-$ groups ($R^7$ being as defined above) or phosphorus-containing groups to cap the hydroxyl groups on the polymeric compound.

Examples of halogen atoms that may be used as the substituents here include fluorine, bromine and chlorine. Examples of the substituted or unsubstituted monovalent hydrocarbon groups having 1 to 10 carbons, and preferably 1 to 8 carbons, that may be used as the substituents include the same as those mentioned above. Suitable examples of the $R^7$ moiety include the examples given above for $R^{10}$.

Examples of suitable $R^7_3Si-$ groups include those in which $R^7$ represents the same substituted or unsubstituted monovalent hydrocarbon groups having 1 to 10 carbons, and preferably 1 to 6 carbons, as above. $R^7$ most preferably stands for an alkyl group. Of these, trialkylsilyl groups, and especially trimethylsilyl groups, are preferred.

Additional examples of suitable substituents include amino groups, alkylamino groups and phosphorus-containing groups.

The proportion of end groups capped with the above substituents is preferably at least 10 mol %, more preferably at least 50 mol %, and most preferably at least 90 mol %. It is even possible to cap substantially all the end groups with the above substituents, representing a capping ratio of essentially 100 mol %.

However, because there are cases in which the ability of the polymer itself to dissolve the ion-conductive salt decreases when all the hydroxyl end groups on the molecular chains of the polymer are capped with halogen atoms, $R^7_3Si-$ groups or phosphorus-containing groups, it is essential to introduce a suitable amount of substituents while taking into consideration the solvating properties of the polymer. This amount, based on the total number of hydroxyl end groups, is preferably 10 to 95 mol %, more preferably 50 to 95 mol %, and most preferably 50 to 90 mol %.

The substituent used in the practice of the invention is most preferably a cyanated monovalent hydrocarbon group. Illustrative examples include cyanobenzyl, cyanobenzoyl, cyanoethyl and other cyanated alkyl groups.

The use of a cyanated monovalent hydrocarbon group such as cyanoethyl in combination with a $R^7_3Si-$ group such as trimethylsilyl is highly advantageous. In this case, the two components are used in respective proportions of preferably 70 to 97 mol %, and especially 90 to 97 mol %, of the cyanated monovalent hydrocarbon groups, and preferably 3 to 30 mol %, and especially 3 to 10 mol %, of the $R^7_3Si-$ groups, based on all the hydroxyl end groups on the molecular chains. Polymer derivatives in which cyanated monovalent hydrocarbon groups and $R^7_3Si-$ groups have been incorporated together in this way possess excellent electrical conductivity and hydrophobic properties.

If cyanoethyl groups are introduced as the substituents, the method of capping the molecular chains of the oxyalkylene chain-bearing polyvinyl alcohol unit-containing polymeric compound may comprise mixing the oxyalkylene chain-bearing polyvinyl alcohol unit-containing polymeric compound with dioxane and acrylonitrile, adding a sodium hydroxide solution to the mixture, and stirring to effect the reaction. This yields a cyanoethylated polymer derivative in which cyanoethyl groups have been introduced onto some or all of the side chains.

In cases where acetyl groups are introduced as the substituent, this may be carried out by, for example, mixing the oxyalkylene chain-bearing polyvinyl alcohol unit-containing polymeric compound with acetic acid and methylene chloride, adding aqueous perchloric acid and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated polymer derivative.

Cyanobenzoyl groups may be introduced as the substituent by a method which involves, for example, mixing the oxyalkylene chain-bearing polyvinyl alcohol unit-containing polymeric compound with dioxane, adding pyridine, then adding dropwise a solution of cyanobenzoyl chloride in dioxane. The solution is then reacted at a given temperature, after which the reaction mixture is poured into a methanol/water (3:4) solution. The precipitate that forms is collected and dissolved in N,N-dimethylsulfoxide, following which the solution is placed in dialysis tubing and dialyzed. The resulting precipitate is collected, rinsed with water, then dried in vacuo, giving a cyanobenzoylated polymer derivative.

The introduction of trimethylsilyl groups may be carried out by dissolving the oxyalkylene chain-bearing polyvinyl alcohol unit-containing polymeric compound in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated polymer derivative.

Capping with other suitable substituents may likewise be carried out using known techniques for introducing those substituents onto hydroxyl end groups.

The polyvinyl alcohol derivative serving as component (E) of the electrolyte composition is typically included in an amount of 0.5 to 30 wt %, and preferably 1 to 20 wt %, based on the overall electrolyte composition. Too much component (E) tends to result in an excessive rise in the viscosity of the composition, which may make it difficult for the composition to penetrate into the fluoropolymer separator. On the other hand, too little component E may lower the closeness and tightness of adhesion as well as the strength, reduce the safety of the battery, and diminish its properties when held at a high temperature.

In particular, the polyvinyl alcohol derivative having cyano-substituted monovalent hydrocarbon groups substituted thereon is preferably included in an amount of 0.1 to 8 wt %, and more preferably 0.3 to 5 wt %, based on the reactive double bond-bearing compound as component C. If this amount is less than 0.1 wt %, more amounts of component C is necessary to gel the overall electrolyte composition, resulting in batteries having poor low-temperature characteristics and rate capability. If this amount is more than 8 wt %, the electrolyte composition has an increased viscosity which impedes penetration into cell assemblies.

When the resulting electrolyte composition containing components A to C and E and in which components C and E together form a semi-IPN structure is placed between two copper sheets separated by a 200 $\mu$m gap and the ionic conductivity at 25° C. is measured by the AC impedance method, the composition generally has an ionic conductivity of $1 \times 10^{-4}$ to $7 \times 10^{-3}$ S/cm, which is fully adequate for the intended purpose.

In the practice of the invention, the ratio $(C_1/C_2) \times 100$ is from 80 to 100%, and preferably from 90 to 100% provided that $C_1$ is the ionic conductivity (S/cm) of an electrolyte composition which contains components A to C and E and in which components C and E together form a semi-interpenetrating polymer network structure and $C_2$ is the ionic conductivity (S/cm) of an electrolyte composition which contains components A, B and C or components A, B and E and does not have a semi-IPN structure.

By including components A to C and E and having components C and E form a semi-IPN structure, the physical properties (e.g., strength, elongation, bond strength) of the resulting electrolyte composition are greatly improved over those of electrolyte compositions composed only of components A to C or components A, B and E, yet formation of the semi-IPN structure may decrease ion mobility within the matrix, lowering ionic conductivity. This is why a combination which makes the ratio $(C_1/C_2) \times 100$ as high as possible is preferred. Hence, the individual components should be selected so that the ratio $(C_1/C_2) \times 100$ falls within the above range.

Even if the conductivity $C_1$ of an electrolyte composition which contains components A to C and E and in which components C and E together form a semi-IPN structure is smaller than the ionic conductivity $C_2$ of an electrolyte composition which contains components A to C or components A, B and E and does not have a semi-IPN structure, the difference is quite small. Thus, the electrolyte composition containing components A to C and E and having a semi-IPN structure is endowed with an ion-conducting ability that is fully adequate for its use as an electrolyte composition in a polymer battery.

The electrolyte composition of the invention has a bond strength, as measured according to the peel-type bond strength test standard for adhesives set forth in JIS K6854 (1994), of preferably at least 0.1 kN/m, more preferably at least 0.2 kN/m, and most preferably at least 0.4 kN/m.

The polyvinyl alcohol derivatives having cyano-substituted monovalent hydrocarbon groups substituted thereon serving as component E are polymeric compounds containing polyvinyl alcohol units and having an average degree of polymerization of at least 20, in which some or all of the hydroxyl groups on the polyvinyl alcohol units are substituted with cyano-substituted monovalent hydrocarbon groups. Because of the relatively short side chain, this polymeric compound is effective for maintaining low the viscosity of the polymer gel electrolyte-forming composition, which can rapidly penetrate into cell assemblies, contributing to improvements in the productivity and performance of polymer batteries.

Illustrative examples of the polymeric compound are polyvinyl alcohols in which some or all of the hydroxyl groups are substituted with cyanoethyl, cyanobenzyl and cyanobenzoyl groups. Of these, cyanoethyl-substituted polyvinyl alcohol is preferred in consideration of the short side chain.

Any well-known methods may be employed in substituting cyano-substituted monovalent hydrocarbon groups for hydroxyl groups on polyvinyl alcohol.

Where a compound having at least two reactive double bonds per molecule and a linear polymeric compound are used as components of the polymer gel electrolyte-forming composition according to the invention, the mixture obtained by mixing these two components (to be referred to as "pre-gel composition") should preferably have a viscosity of not higher than 100 centipoise, especially not higher than 50 centipoise, as measured at 20° C. by a Brookfield viscometer. The pre-gel composition having a viscosity within this range is effective for reducing the viscosity of the polymer gel electrolyte-forming composition, which can rapidly penetrate into cell assemblies, resulting in polymer batteries having improved characteristics.

It is preferred that the polymer gel electrolyte-forming composition be prepared so as to have a viscosity of not higher than 100 centipoise, more preferably not higher than 50 centipoise, and most preferably not higher than 30 centipoise, as measured at 20° C. by a Brookfield viscometer.

The method of manufacturing the polymer battery of the third embodiment of the invention comprises the steps of:

(a) impregnating an electrolyte composition containing above-described components A to C and E into a cell assembly having a positive electrode, a negative electrode, and a separator disposed between the positive and negative electrodes that is composed primarily of a fluoropolymer; then (b) forming a semi-IPN structure in which molecular chains on the polyvinyl alcohol derivative of component E are interlocked with a three-dimensional polymer network structure obtained by heating or exposing the component C compound to a suitable form of radiation (e.g., electron beam, microwave, or radio-frequency radiation) so as to effect crosslinking. The method of polymerization used for this purpose is the same as that described above for the first embodiment of the invention.

The polymer battery of the present embodiment is assembled by stacking (FIG. 4), fan-folding (FIG. 5) or winding (FIG. 6) the cell assembly and inserting it in an aluminum laminate bag or a metal case, or by forming it into a coin-like shape (FIG. 7) and placing it in a battery housing such as a battery can or a laminate pack. The cell assembly is then filled with an amount of the electrolyte composition sufficient to fully impregnate the positive and negative electrodes and the separator. Finally, the battery enclosure is mechanically sealed if it is a can, or heat-sealed if it is a laminate pack. The coin cell shown in FIG. 7 has a case 1, a first electrode 2, a second electrode 5, a gasket 3, a separator 4, and a cap 6.

The resulting polymer battery according to the third embodiment of the invention has a high safety, good heat cycling resistance, and robust characteristics even when held at a high temperature. These features make it particularly well suited for use as a lithium secondary cell or a lithium ion secondary cell.

Fourth Embodiment of the Invention

The polymer battery according to a fourth embodiment of the invention includes a cell assembly having a positive electrode, a negative electrode, and a separator disposed between the positive and negative electrodes that is composed primarily of a fluoropolymer. The battery is made by impregnating the cell assembly with an electrolyte composition containing (A) an ion-conductive salt, (B) a solvent in which the ion-conductive salt is soluble, (C) a compound having at least two reactive double bonds per molecule and (F) a polyglycidol derivative, then forming a semi-interpenetrating polymer network structure in which molecular chains on the component F polymer are interlocked with a three-dimensional polymer network structure obtained by crosslinking the component C compound.

The cell assembly and components A to C used in this embodiment are the same as those described above for the first embodiment of the invention.

The polyglycidol derivative serving as component F helps to create a firm semi-IPN structure in which the highly branched molecular chains of the polyglycidol derivative are interlocked with a three-dimensional network structure formed by reacting the reactive double bond-bearing compound of component C. This semi-IPN structure enhances the compatibility between the different types of polymer chains and also increases bond strength between the chains, thus improving adhesion, lowering the rate of electrolyte evaporation and providing better shape retention.

The polyglycidol derivative serving as component F is a compound containing units of formula (5) (referred to hereinafter as "A units")

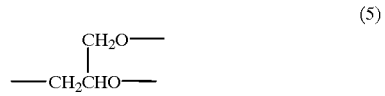

and units of formula (6) (referred to hereinafter as "B units")

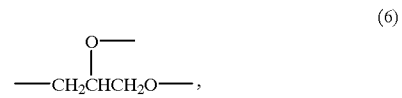

in which compound the ends of the molecular chains are capped with specific substituents.

The polyglycidol can be prepared by polymerizing glycidol or 3-chloro-1,2-propanediol, although it is generally advisable to carry out polymerization using glycidol as the starting material.

Known processes for carrying out such a polymerization reaction include (1) processes involving the use of a basic catalyst such as sodium hydroxide, potassium hydroxide or any of various amine compounds; and (2) processes involving the use of a Lewis acid catalyst (see A. Dworak et al.: *Macromol. Chem. Phys.* 196, 1963–1970 (1995); and R. Toker: *Macromolecules* 27, 320–322 (1994)).

The first type of polymerization process (1), involving the use of a basic catalyst, is usually carried out by adding an alcoholic compound (active hydrogen compound) as the starting point, and does not readily provide a high-molecular-weight polymer. The reaction mechanism is shown below.

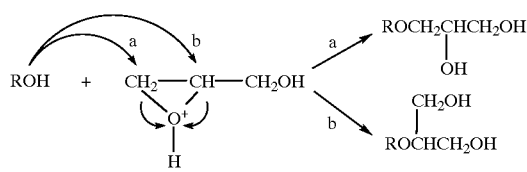

This polymerization process involves, more specifically, charging a flask with a given amount of glycidol, adding methylene chloride as the solvent, setting the system to a given temperature, adding a given amount of potassium hydroxide as the catalyst, and stirring to effect the reaction. An active hydrogen compound is added as needed during the reaction. Following reaction completion, methanol is added to terminate the reaction, and the methanol and methylene chloride are removed by distillation in vacuo. The resulting polymer is dissolved in water and neutralized using an ion-exchange resin, following which the ion-exchange resin is removed by filtration and the polymer is dried by driving off the water in vacuo, thereby giving the polyglycidol.

Examples of active hydrogen compounds that may be used in the above procedure include alcohols such as ethanol, methanol, isopropanol and benzyl alcohol; polyols such as glycerol, pentaerythritol, sorbitol, diethylene glycol, ethylene glycol, threose, tetraose, pentose and hexose; and hydroxyl group-bearing polymeric compounds such as polyvinyl alcohol and polyethylene vinyl alcohol.

The active hydrogen compound is added in an amount, expressed as a molar ratio (number of moles of active hydrogen groups on the active hydrogen compound added)/

(number of moles of glycidol charged), within a range of 0.0001 to 1, preferably 0.001 to 1, more preferably 0.005 to 0.5, and most preferably 0.01 to 0.1.

The second type of polymerization process (2), involving the use of a Lewis acid catalyst, is carried out in a nonaqueous system. The reaction mechanism is shown below.

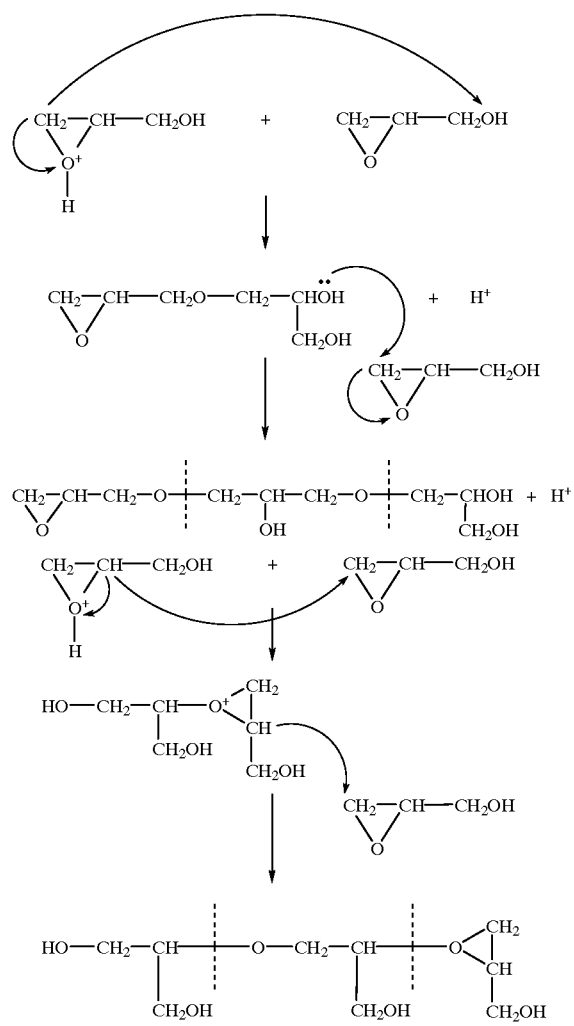

This polymerization process specifically involves charging a flask with a given amount of glycidol, using methylene chloride as a solvent if necessary, and carrying out the reaction at a given reaction temperature, with the addition of a given amount of catalyst (reaction initiator), under a stream of nitrogen gas and with stirring. Following reaction completion, methanol is added to terminate the reaction, then the methanol and methylene chloride are removed by distillation in vacuo. The resulting polymer is dissolved in water and neutralized with sodium hydrogen carbonate, after which the solution is passed through a column filled with ion-exchange resin. The solution that has passed through the column is filtered, and the filtrate is dried by distillation in vacuo, thereby giving the polyglycidol.

The catalyst (reaction initiator) used in this case may be trifluoroborate diethyl etherate ($BF_3 \cdot OEt_2$), $SnCl_4$ or $HPF_6 \cdot OEt_2$ (where "Et" stands for an ethyl group).

The polyglycidol thus prepared, when measured by $^{13}C$-NMR spectroscopy (DEPT spectrum measured using a Varian VXR-300 NMR spectrometer, with $D_2O$ as the solvent), has peaks for carbons originating in two types of units (A units and B units), from which it can be confirmed that the polyglycidol is composed of both A units and B units.

The total number of A and B groups in the above polyglycidol is preferably at least two, more preferably at least six, and most preferably at least ten. There is no particular upper limit, although a total number of such groups which does not exceed 10,000 is preferred. The total number of A and B units is preferably low in cases where the polyglycidol must have the flowability of a liquid, and is preferably high where a high viscosity is required.

The appearance of these A and B units is not regular, but random. Any combination is possible, including, for example, -A-A-A-, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw), as determined by gel permeation chromatography (GPC), within a range of preferably 200 to 730,000, more preferably 200 to 100,000, and most preferably 600 to 20,000. Polyglycidol having a weight-average molecular weight of up to about 2,000 is a highly viscous liquid that flows at room temperature, whereas polyglycidol with a weight-average molecular weight above 3,000 is a soft, paste-like solid at room temperature. The average molecular weight ratio (Mw/Mn) is preferably 1.1 to 20, and most preferably 1.1 to 10.

Depending on its molecular weight, the polyglycidol varies in appearance at room temperature (20° C.) from a highly viscous molasses-like liquid to a rubbery solid. The higher the molecular weight, the more it qualifies as a solid (albeit a soft, paste-like solid) with its low fluidity at room temperature.

Regardless of how large or small its molecular weight, the polyglycidol is not a linear polymer, but rather an amorphous polymer due to the interlocking of its highly branched molecular chains. This is evident from the wide-angle x-ray diffraction pattern, which lacks any peaks that would be indicative of the presence of crystals.

Figure 3:
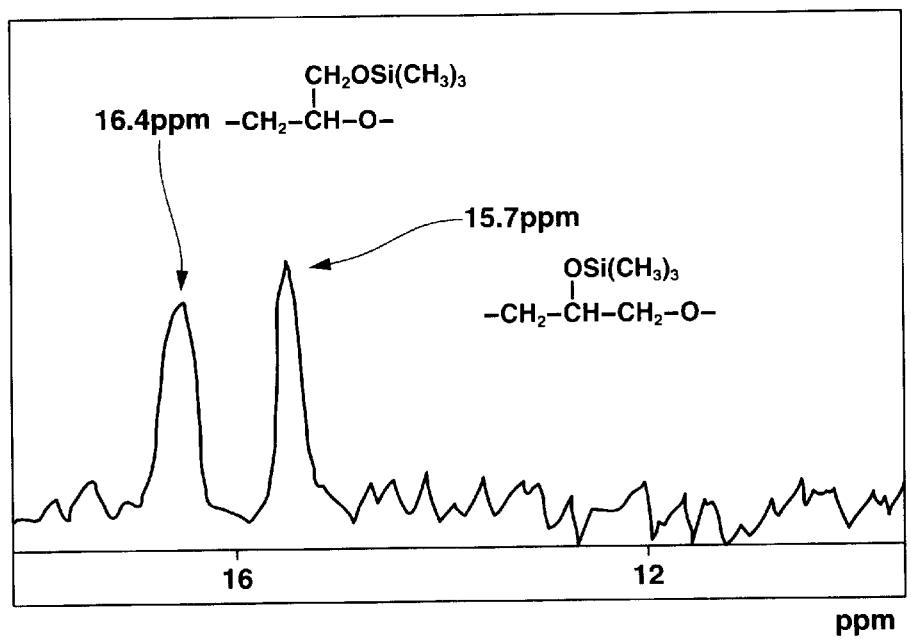
FIG. 3 is a $^{29}$Si-NMR spectrum of trimethylsilylated polyglycidol.

The ratio of A units to B units in the molecule can be determined by measuring the $^{29}Si$-NMR spectrum of trimethylsilylated polyglycidol (see FIG. 3) prepared by introducing trimethylsilyl groups onto the hydroxyl groups of the polyglycidol. In the present case, the molar ratio of A units to B units (A:B) is within a range of preferably 1/9 to 9/1, and especially 3/7 to 7/3.

Because the polyglycidol is colorless, transparent and nontoxic, it can be used in a broad range of applications, such as an electrochemical material, including a binder substance for various active materials (e.g., binders in electroluminescent devices), as a thickener, or as an alkylene glycol substitute.

In the practice of the invention, component F is a polyglycidol derivative in which at least 10% of the terminal hydroxyl groups on the molecular chains of the above-described polyglycidol are capped with one or more type of monovalent group selected from among halogen atoms, substituted or unsubstituted monovalent hydrocarbon groups, $R^7CO$— groups (wherein $R^7$ is a substituted or unsubstituted monovalent hydrocarbon group), $R^7{}_3Si$— groups (wherein $R^7$ is as defined above), amino groups, alkylamino groups, and phosphorus atom-containing groups.

The purpose of capping the ends of the polyglycidol molecular chains with the above groups is two-fold.

(1) In a polymer containing a high concentration of ion-conductive salt, dissociated metal cations and counter ions (anions) will readily recombine in a low-dielectricconstant polymer matrix, lowering the conductivity. Because raising the polarity of the polymer matrix discourages ion association, one aim is to increase the dielectric constant of the matrix polymer by introducing polar groups onto the side chains (hydroxyl groups) of the polyglycidol.

(2) The second aim is to impart the polymeric compound with highly desirable characteristics, such as hydrophobic properties and fire retardance.

To increase the dielectric constant of the polymeric compound according to the first of these aims, the polyglycidol is reacted with a hydroxy-reactive compound so as to cap the hydroxyl end groups on the molecular chains of the polyglycidol with highly polar substituents.

Although the highly polar substituents used for this purpose are not subject to any particular limitation, neutral substituents are preferable to ionic substituents. Exemplary substituents include substituted and unsubstituted monovalent hydrocarbon groups, and $R^7CO$— groups (wherein $R^7$ is a substituted or unsubstituted monovalent hydrocarbon group). If necessary, capping may also be carried out with other suitable substituents, such as amino groups or alkylamino groups.

The second purpose of capping mentioned above, which is to confer the polymeric compound with hydrophobic properties and fire retardance, can be achieved by the use of, for example, halogen atoms, $R^7_3Si$— groups ($R^7$ being as defined above) or phosphorus-containing groups to cap the hydroxyl end groups on the molecular chains of the polyglycidol.

Examples of halogen atoms that may be used as the substituents here include fluorine, bromine and chlorine. Exemplary substituted or unsubstituted monovalent hydrocarbon groups which may be used as such substituents are substituted or unsubstituted monovalent hydrocarbon groups having 1 to 10 carbons, and preferably 1 to 8 carbons, including alkyls such as methyl, ethyl, propyl, isopropyl, butyl, isobutyl, tert-butyl, pentyl, neopentyl, hexyl, cyclohexyl, octyl, nonyl and decyl; aryls such as phenyl, tolyl and xylyl; aralkyls such as benzyl, phenylethyl and phenylpropyl; alkenyls such as vinyl, allyl, propenyl, isopropenyl, butenyl, hexenyl, cyclohexenyl and octenyl; and any of these groups in which some or all of the hydrogen atoms are substituted with, for example, halogen atoms (e.g., fluorine, bromine, chlorine), cyano groups, hydroxyl groups, amino groups, aminoalkyl groups or phosphono groups, such as cyanobenzyl, cyanoethyl and other cyano-group bearing alkyls, chloromethyl, chloropropyl, bromoethyl and trifluoropropyl. Any one or combinations of two or more such substituents may be used.

Examples of suitable $R^7CO$— groups include those in which $R^7$ represents the same substituted or unsubstituted monovalent hydrocarbon groups having 1 to 10 carbons, and preferably 1 to 8 carbons, as above. $R^7$ preferably stands for an alkyl group or a phenyl group. Acyl groups, benzoyl and cyanobenzoyl are especially preferred.

Examples of suitable $R^7_3Si$— groups include those in which $R^7$ represents the same substituted or unsubstituted monovalent hydrocarbon groups having 1 to 10 carbons, and preferably 1 to 8 carbons, as above. $R^7$ preferably stands for alkyl groups. Trialkylsilyl groups, and especially trimethylsilyl, are preferred.

Additional examples of suitable substituents include amino groups, alkylamino groups and phosphorus-containing groups.

The proportion of end groups capped with the above substituents is at least 10 mol %, preferably at least 50 mol %, and most preferably at least 90 mol %. It is even possible to cap substantially all the end groups with the above substituents, representing a capping ratio of essentially 100 mol %.

However, because there are cases in which the ability of the polymer itself to dissolve the ion-conductive salt decreases when all the hydroxyl end groups on the molecular chains of the polymer are capped with halogen atoms, $R^7_3Si$— groups or phosphorus-containing groups, it is essential to introduce a suitable amount of substituent while taking into consideration the solvating properties of the polymer. This amount, based on the total number of hydroxyl end groups, is preferably 10 to 95 mol %, more preferably 50 to 95 mol %, and most preferably 50 to 90 mol %.

The substituent used in the practice of the invention is most preferably a cyano group-substituted monovalent hydrocarbon group or both a cyano group-substituted monovalent hydrocarbon group and a $R^7_3Si$— group. Illustrative examples include cyanobenzyl, cyanobenzoyl, cyanoethyl and other alkyl groups to which a cyano group is attached, or a combination of any of these cyano group-substituted monovalent hydrocarbon groups with trimethylsilyl, for instance.

When a cyano group-substituted monovalent hydrocarbon group such as cyanoethyl is used in combination with a $R^7_3Si$— group such as trimethylsilyl, the two components are used in respective proportions of preferably 70 to 97 mol %, and especially 90 to 97 mol %, of the cyano group-substituted monovalent hydrocarbon groups, and preferably 3 to 30 mol %, and especially 3 to 10 mol %, of the $R^7_3Si$— groups, based on all the hydroxyl end groups on the molecular chains. Polyglycidol derivatives in which cyano group-substituted monovalent hydrocarbon groups and $R^7_3Si$— groups have been incorporated together in this way possess excellent electrical conductivity and hydrophobic properties.

When cyanoethyl groups are introduced as the substituent, the method for capping the molecular chains of the polyglycidol with such substituents may comprise mixing the polyglycidol with dioxane and acrylonitrile, adding a sodium hydroxide solution to the mixture, and stirring to effect the reaction. This yields a cyanoethylated polyglycidol in which cyanoethyl groups have been introduced onto some or all of the side chains.

In cases where acetyl groups are introduced as the substituent, this may be carried out by, for example, mixing the polyglycidol with acetic acid and methylene chloride, adding aqueous perchloric acid and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated polyglycidol.

Cyanobenzoyl groups may be introduced as the substituent by a method which involves, for example, mixing the polyglycidol with dioxane, adding pyridine, then adding dropwise a solution of cyanobenzoyl chloride in dioxane. Next, the resulting solution is reacted at a given temperature, after which the reaction mixture is poured into a methanol/water (3:4) solution. The precipitate that forms is collected and dissolved in N,N-dimethylsulfoxide, following which the solution is placed in dialysis tubing and dialyzed. The resulting precipitate is collected, rinsed with water, then dried in vacuo, giving a cyanobenzoylated polyglycidol.

The introduction of trimethylsilyl groups may be carried out by dissolving the polyglycidol in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated polyglycidol.

Capping with other suitable substituents may likewise be carried out using known techniques for introducing those substituents onto hydroxyl end groups.

The polyglycidol derivative serving as component F of the electrolyte composition is typically included in an amount of 0.5 to 30 wt %, and preferably 1 to 20 wt %, based on the overall electrolyte composition. Too much component F tends to result in an excessive rise in the viscosity of the composition, which may make it difficult for the composition to penetrate into the fluoropolymer separator. On the other hand, too little component F may lower the closeness and tightness of adhesion as well as the strength, reduce the safety of the battery, and diminish its properties when held at a high temperature.

When the resulting electrolyte composition containing components A to C and F and in which components C and F together form a semi-IPN structure is placed between two copper sheets separated by a 200 μm gap and the ionic conductivity at 25° C. is measured by the AC impedance method, the composition generally has an ionic conductivity of preferably from $1 \times 10^{-4}$ to $7 \times 10^{-3}$ S/cm, which is fully adequate for the intended purpose.

In the practice of the invention, the ratio $(C_1/C_2) \times 100$ is from 80 to 100%, and preferably from 90 to 100% provided that $C_1$ is the ionic conductivity (S/cm) of an electrolyte composition which contains components A to C and F and in which components C and F together form a semi-interpenetrating polymer network structure and $C_2$ is the ionic conductivity (S/cm) of an electrolyte composition which contains components A, B and C or components A, B and F and does not have a semi-IPN structure.

By including components A to C and F and having components C and F form a semi-IPN structure, the physical properties (e.g., strength, elongation, bond strength) of the resulting electrolyte composition are greatly improved over those of electrolyte compositions composed only of components A, B and C or components A, B and F, yet formation of the semi-IPN structure may decrease ion mobility within the matrix, lowering ionic conductivity. This is why a combination which makes the ratio $(C_1/C_2) \times 100$ as high as possible is preferred. Hence, the individual components should be selected so that the ratio $(C_1/C_2) \times 100$ falls within the above range.

Even if the conductivity $C_1$ of an electrolyte composition which contains components A to C and F and in which components C and F together form a semi-IPN structure is smaller than the ionic conductivity $C_2$ of an electrolyte composition which contains components A, B and C or components A, B and F and does not have a semi-IPN structure, the difference is quite small. Thus, the electrolyte composition containing components A to C and F and having a semi-IPN structure is endowed with an ion-conducting ability that is fully adequate for its use as an electrolyte composition in a polymer battery.

The method of manufacturing the polymer battery of the fourth embodiment of the invention comprises the steps of:

(a) impregnating an electrolyte composition containing above-described components A to C and F into a cell assembly having a positive electrode, a negative electrode, and a separator disposed between the positive and negative electrodes that is composed primarily of a fluoropolymer; then (b) forming a semi-IPN structure in which molecular chains on the polyglycidol derivative of component F are interlocked with a three-dimensional polymer network structure obtained by heating or exposing the component C compound to a suitable form of radiation (e.g., electron beam, microwave, or radio-frequency radiation) so as to effect crosslinking. The method of polymerization used for this purpose is the same as that described above for the first embodiment of the invention.

The polymer battery of the present embodiment is assembled by stacking (FIG. 4), fan-folding (FIG. 5) or wound (FIG. 6) the cell assembly and inserting it in an aluminum laminate bag or a metal case, or by forming it into a coin-like shape (FIG. 7) and placing it in a battery housing such as a battery can or a laminate pack. The cell assembly is then filled with an amount of the electrolyte composition sufficient to fully impregnate the positive and negative electrodes and the separator. Finally, the battery enclosure is mechanically sealed if it is a can, or heat-sealed if it is a laminate pack. The coin cell shown in FIG. 7 has a case 1, a first electrode 2, a second electrode 5, a gasket 3, a separator 4, and a cap 6.

The resulting polymer battery according to the fourth embodiment of the invention has a high safety, good thermal cycling resistance, and robust characteristics even when held at a high temperature. These features make it particularly well suited for use as a lithium secondary cell or a lithium ion secondary cell.

Polymer batteries according to any of the above-described first to fourth embodiments of the invention, when heated to 70° C. and held at that temperature for one week, undergo a percent rise in the internal resistance of the battery after heating as opposed to before heating, expressed as shown in the formula below, of preferably not more than 50%, more preferably not more than 30%, and most preferably from 1 to 29%. Too large a percent rise in the internal resistance compromises the load characteristics of the battery, lowering its capacity and making it incapable of functioning effectively as a battery.

$$\text{Percent rise in internal resistance}(\%) = \frac{B-A}{A} \times 100$$

In the formula, A represents the internal resistance before heating, and B is the internal resistance after heating. Both values are in ohms.

In a 500-cycle charge/discharge test conducted under the conditions described below, the polymer batteries of the present invention maintain preferably at least 60%, more preferably at least 75%, and most preferably 75 to 100%, of their discharge output. If the discharge output is not maintained to a sufficient degree, the battery cannot be repeatedly charged and discharged, making it incapable of functioning as a secondary battery.

500-Cycle Charge/Discharge Test:

A 500-cycle charge/discharge test was conducted at a two hour rate of discharge (0.5 C) of theoretical capacity. That is, each battery was charged at 23° C. and a constant current and constant voltage to an upper limit of 4.2 V. Constant current discharge at 0.5 C was then carried out to a final voltage of 3.2 V. Using this method to determine the discharge capacity, the discharge output maintained after 500 cycles was calculated as a percentage of the initial discharge output.

The polymer battery is preferably a film-type (paper-type) cell, although other suitable cell shapes may be used without particular limitation, including button, coin, prismatic and stacked cells, as well as cylindrical cells having a spiral construction.

The polymer batteries of the invention are well-suited for use in a broad range of applications, including main power supplies and memory backup power supplies for portable electronic equipment such as camcorders, notebook computers and wireless terminals, backup power supplies for equipment such as personal computers, power regeneration in transport devices such as electric cars and hybrid cars, together with solar cells as energy storage systems for solar power generation, and in combination with other batteries as load-leveling power supplies.

EXAMPLES

The following synthesis examples, production examples, examples of the invention and comparative examples are provided to illustrate the invention, and are not intended to limit the scope thereof.

Synthesis Example 1

Synthesis of Polyvinyl Alcohol Derivative (1)

A reaction vessel equipped with a stirring element was charged with 10 parts by weight of polyvinyl alcohol (average degree of polymerization, 500; vinyl alcohol fraction, ≧98%) and 70 parts by weight of acetone. A solution of 1.81 parts by weight of sodium hydroxide in 2.5 parts by weight of water was gradually added under stirring, after which stirring was continued for one hour at room temperature. To this solution was gradually added, over a period of 3 hours, a solution of 67 parts by weight of glycidol in 100 parts by weight of acetone. The resulting mixture was stirred for 8 hours at 50° C. to effect the reaction. Following reaction completion, stirring was stopped, whereupon the polymer precipitated from the mixture. The precipitate was collected, dissolved in 400 parts by weight of water, and neutralized with acetic acid. The neutralized polymer was purified by dialysis, and the resulting solution was freeze-dried, giving 22.50 parts by weight of dihydroxypropylated polyvinyl alcohol.

The reaction product had the molecular structure shown below.

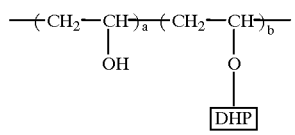

Here, DHP represents the dihydroxypropyl group which formed as a result of glycidol addition. The structure is that of an oligomer chain having either of the following linkages.

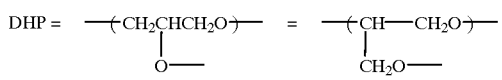

The molar substitution (MS) can be calculated as follows from the weight of the polyvinyl alcohol (PVA) charged and the weight of the product obtained.

$$\frac{\text{Unit molecular weight of PVA}}{\text{Unit molecular weight of PVA derivative obtained by addition of } n \text{ units of glycidol}} = \frac{44}{44+74n} \quad n = 0.74$$

$$= \frac{10 \text{ (weight of charged PVA)}}{22.50 \text{ (weight of product)}}$$

The average molar substitution calculated from the yield is thus 0.74.

FIG. 1 shows the $^{13}$C-NMR spectrum (DEPT spectrum measured using a Varian VXR-300 NMR spectrometer, with $D_2O$ as the solvent) of this product.

The average molar substitution determined from the C* carbon signal intensity (A) for —C*H$_2$—C(OH)H— units from the unreacted PVA and the signal intensity (C) for other carbons was 0.95.

In addition, the fraction of unreacted —(CH$_2$—C(OH)H)— units determined by comparing signal intensities (A) and (C) was 0.57.

Accordingly, in the above formula, a=0.57 and b=0.43. Hence, the average length L of the DHP chain was L=MS/b=2.21.

Three parts by weight of the resulting PVA polymer was mixed with 20 parts by weight of dioxane and 14 parts by weight of acrylonitrile. To this mixed solution was added a solution of 0.16 part by weight of sodium hydroxide in 1 part by weight of water, and stirring was carried out for 10 hours at 25° C. The resulting mixture was neutralized using the ion-exchange resin produced by Organo Corporation under the trade name Amberlite IRC-76. The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and re-dissolved in acetone. The resulting solution was filtered, following which the acetone was evaporated off, giving a cyanoethylated PVA polymer derivative.

The infrared absorption spectrum of this polymer derivative showed no hydroxyl group absorption, confirming that all the hydroxyl groups were capped with cyanoethyl groups (capping ratio, 100%).

Synthesis Example 2

Synthesis of Polyvinyl Alcohol Derivative (2)

A reaction vessel equipped with a stirring element was charged with 3 parts by weight of polyvinyl alcohol (average degree of polymerization, 500; vinyl alcohol fraction, ≧98%), 20 parts by weight of 1,4-dioxane and 14 parts by weight of acrylonitrile. With stirring, an aqueous solution containing 0.16 part by weight of sodium hydroxide in 1 part by weight of water was slowly added. The mixture was stirred for 10 hours at 25° C.

The reaction solution was neutralized using an ion exchange resin (trade name: Amberlite IRC-76 by Organo Corporation). The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and dissolved in acetone again. The resulting solution was filtered, following which the acetone was evaporated off, giving a cyanoethylated PVA derivative.

For the polymer derivative thus obtained, no evidence of hydroxyl group absorption was ascertained by infrared absorption spectroscopy. It was confirmed that all the hydroxyl groups were capped with cyanoethyl groups (capping ratio, 100%).

Synthesis Example 3
Synthesis of Cellulose Derivative

Eight grams of hydroxypropyl cellulose (molar substitution, 4.65; product of Nippon Soda Co., Ltd.) was suspended in 400 mL of acrylonitrile, following which 1 mL of 4 wt % aqueous sodium hydroxide was added and the mixture was stirred 4 hours at 30° C.

The reaction mixture was then neutralized with acetic acid and poured into a large amount of methanol, giving cyanoethylated hydroxypropyl cellulose.

To remove the impurities, the cyanoethylated hydroxypropyl cellulose was dissolved in acetone, following which the solution was placed in a dialysis membrane tube and purified by dialysis using ion-exchanged water. The cyanoethylated hydroxypropyl cellulose which settled out during dialysis was collected and dried.

Elemental analysis of the resulting cyanoethylated hydroxypropyl cellulose indicated a nitrogen content of 7.3 wt %. Based on this value, the proportion of the hydroxyl groups on the hydroxypropyl cellulose that were capped with cyanoethyl groups was 94%.

Synthesis Example 4
Synthesis of Glycidol Derivative

A glycidol-containing flask was charged with methylene chloride to a glycidol concentration of 4.2 mol/L, and the reaction temperature was set at −10° C.

Trifluoroborate diethyl etherate ($BF_3.OEt_2$) was added as the catalyst (reaction initiator) to a concentration of $1.2 \times 10^{-2}$ mol/L, and the reaction was carried out by stirring for 3 hours under a stream of nitrogen. Following reaction completion, methanol was added to stop the reaction, after which the methanol and methylene chloride were removed by distillation in a vacuum.

The resulting crude polymer was dissolved in water and neutralized with sodium hydrogen carbonate, after which the solution was passed through a column packed with an ion-exchange resin (produced by Organo Corporation under the trade name Amberlite IRC-76). The eluate was passed through 5C filter paper, the resulting filtrate was distilled in vacuo, and the residue from distillation was dried.

The resulting purified polyglycidol was analyzed by gel permeation chromatography (GPC) using 0.1 M saline as the mobile phase, based upon which the polyethylene glycol equivalent weight-average molecular weight was found to be 6,250. Evaluation of the crystallinity by wide-angle x-ray diffraction analysis showed the polyglycidol to be amorphous. The polyglycidol was a soft, paste-like solid at room temperature.

Three parts by weight of the resulting polyglycidol was mixed with 20 parts of dioxane and 14 parts of acrylonitrile. To this mixed solution was added aqueous sodium hydroxide comprising 0.16 part of sodium hydroxide dissolved in 1 part by weight of water, and stirring was carried out for 10 hours at 25° C. to effect the reaction. Following reaction completion, 20 parts of water was added to the mixture, which was then neutralized using an ion-exchange resin (Amberlite IRC-76, produced by Organo Corporation). The ion-exchange resin was separated off by filtration, after which 50 parts by weight of acetone was added to the solution and the insolubles were filtered off. The filtrate was vacuum concentrated, yielding crude cyanoethylated polyglycidol. The crude cyanoethylated polyglycidol was dissolved in acetone and the solution was filtered using 5A filter paper, then the polyglycidol was precipitated out of solution in water and the precipitate was collected. These two operations (dissolution in acetone and precipitation in water) were repeated twice, following which the product was dried in vacuo at 50° C., giving purified cyanoethylated polyglycidol.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. The polyglycidol was a soft, paste-like solid at room temperature.

Production Example 1
Production of Cell Assembly A
Fabrication of Negative Electrode:

Milled graphite powder (90 parts by weight) and vinylidene fluoride-hexafluoropropylene copolymer (10 parts by weight) as the binder were mixed together to give a negative electrode compound, which was then dispersed in N-methyl-2-pyrrolidone to form a slurry.

The slurry was uniformly coated onto one side of a 10 $\mu$m thick copper foil strip serving as the negative electrode current collector and dried, then pressed using a roller press, thereby forming a negative electrode.

Fabrication of Positive Electrode:

Lithium carbonate and cobalt carbonate were mixed in a molar ratio of 0.5 to 1, then roasted in air at 900° C. for 5 hours to give a positive electrode active material ($LiCoO_2$). Next, 91 parts by weight of the resulting $LiCoO_2$, 6 parts by weight of graphite as the electrically conductive material, and 10 parts by weight of vinylidene fluoride-hexafluoropropylene copolymer as the binder were mixed together to give a positive electrode compound. The positive electrode compound was then dispersed in N-methyl-2-pyrrolidone to form a slurry. The resulting slurry was coated onto one side of a 20 $\mu$m thick aluminum foil strip serving as the positive electrode current collector and dried, then pressed using a roller press, thereby forming a positive electrode.

Fabrication of Separator:

A polyvinylidene fluoride (PVDF) solution was prepared by mixing together 75 parts by PVDF (weight-average molecular weight, 530,000; supplied by Aldrich Chemical Co., Ltd.), 25 parts by weight of $SiO_2$ powder (produced by Nippon Aerosil Co., Ltd. under the trade name Aerosil 200), and 1,000 parts by weight of N,N'-dimethylformamide (DMF) as the solvent.

The PVDF solution was coated onto the negative and positive electrodes to a thickness of 50 $\mu$m, then heated at 100° C. for 5 hours to evaporate off the solvent, thereby giving separator-coated positive and negative electrodes.

Figure 8:
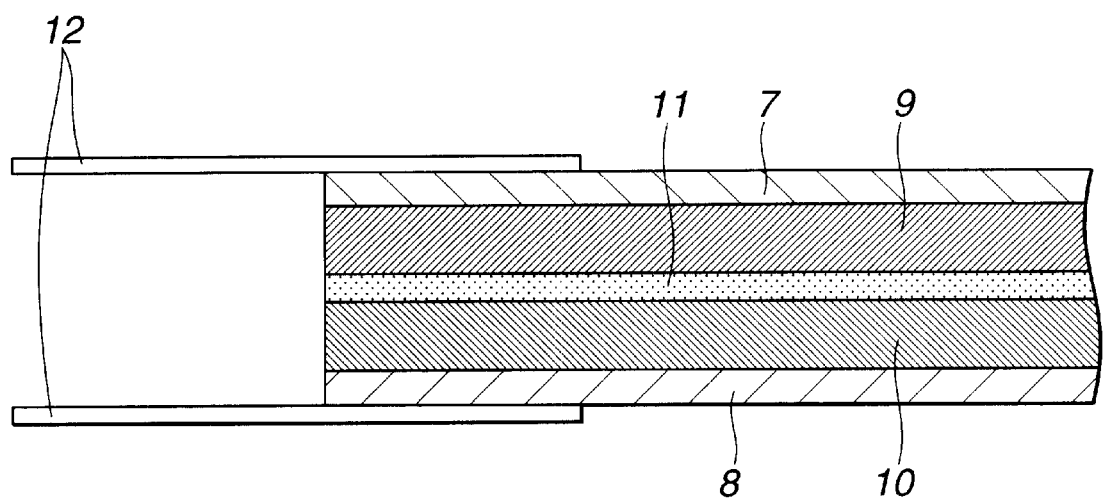
FIG. 8 is schematic cross-sectional view of a polymer battery according to an embodiment of the invention.

Next, the positive electrode 9 and the negative electrode 10 were stacked as shown in FIG. 8 with the PVDF layers 11 facing each other, and bonded under heat (170° C.) and pressure, thereby giving a cell assembly A. FIG. 8 also shows the positive electrode current collector 7 and the negative electrode current collector 8.

A separate metal tab 12 was mounted as a current lead on each of the two current collectors in the resulting cell assembly A, and the cell assembly was inserted into an aluminum laminate bag as the battery enclosure.

Production Example 2
Production of Cell Assembly B

Aside from using PVDF having a weight-average molecular weight of 1,200,000, a cell assembly B was fabricated in the same way as in Production Example 1.

Metal tabs were mounted as current leads on the two current collectors in the resulting cell assembly B, and the cell assembly was inserted into an aluminum laminate bag as the battery enclosure.

Production Example 3
Production of Cell Assembly C

The PVDF solution prepared in Production Example 1 was cast to a thickness of 60 $\mu$m onto a Teflon-coated glass plate, then heated at 100° C. for 8 hours to evaporate off the N,N'-dimethylformamide.

The PVDF film was then peeled from the glass plate, giving a polymer film. The film was placed between the same positive and negative electrodes as in Production Example 1, following which the PVDF film and the electrodes were bonded under applied heat (170° C.) and pressure.

Metal tabs were mounted as current leads on the two current collectors in the resulting cell assembly C, and the cell assembly was inserted into an aluminum laminate bag as the battery enclosure.

Production Example 4
Production of Cell Assembly D

Ten parts by weight of a vinylidene fluoride-hexafluoropropylene copolymer having a weight-average molecular weight of 700,000, 60 parts by weight of diethyl carbonate and 30 parts by weight of dibutyl phthalate were mixed together. The mixture was coated with a doctor knife to a thickness of 50 $\mu$m onto the surfaces of the same positive and negative electrodes as in Production Example 1. The coated electrodes were then heated at 100° C. for 8 hours to evaporate off the diethyl carbonate, giving separator-coated positive and negative electrodes.

The coated positive and negative electrodes were then stacked with the vinylidene fluoride-hexafluoropropylene copolymer layers facing each other, and bonded under applied pressure, following which the laminate was immersed in diethyl ether and the dibutyl phthalate was removed by solvent extraction. Following solvent extraction, the laminate was dried at room temperature, then subjected to heat (150° C.) and pressure, giving a cell assembly D.

Metal tabs were mounted as current leads on the two current collectors in the resulting cell assembly D, and the cell assembly was inserted into an aluminum laminate bag as the battery enclosure.

Production Example 5
Preparation of Electrolyte Composition A $LiClO_4$ was dissolved to a concentration of 1 mol/L in a mixture of equal parts by weight of ethylene carbonate and diethylene carbonate.

Twenty parts by weight of polyethylene glycol dimethacrylate (number of oxyethylene units=9), 10 parts by weight of methoxypolyethylene glycol monomethacrylate (number of oxyethylene units=9), and 0.15 part by weight of azobisisobutyronitrile as the initiator were added to 120 parts by weight of the $LiClO_4$ solution, following which the components were mixed, giving electrolyte composition A.

The resulting electrolyte composition A was placed between two copper sheets separated by a 200 $\mu$m gap, and the ionic conductivity of the composition was measured by the AC impedance method at 25° C. A value of $5.0 \times 10^{-3}$ S/cm was obtained Production Example 6
Preparation of Electrolyte Composition B $LiClO_4$ was dissolved to a concentration of 1 mol/L in a mixture of equal parts by weight of ethylene carbonate and diethylene carbonate.

Twenty parts by weight of polyethylene glycol dimethacrylate (number of oxyethylene units=9), 10 parts by weight of methoxypolyethylene glycol monomethacrylate (number of oxyethylene units=9), 5 parts by weight of the polyvinyl alcohol derivative prepared in Synthesis Example 1, and 0.15 part by weight of azobisisobutyronitrile as the initiator were added to 120 parts by weight of the $LiClO_4$ solution, following which the components were mixed, giving electrolyte composition B.

The resulting electrolyte composition B was placed between two copper sheets separated by a 200 $\mu$m gap and the ionic conductivity of the composition was measured by the AC impedance method at 25° C. A value of $4.3 \times 10^{-3}$ S/cm was obtained.

Production Example 7
Preparation of Electrolyte Composition C $LiClO_4$ was dissolved to a concentration of 1 mol/L in a mixture of equal parts by weight of ethylene carbonate and diethylene carbonate.

Twenty parts by weight of polyethylene glycol dimethacrylate (number of oxyethylene units=9), 10 parts by weight of methoxypolyethylene glycol monomethacrylate (number of oxyethylene units=9), 5 parts by weight of the polyvinyl alcohol derivative prepared in Synthesis Example 2, and 0.15 part by weight of azobisisobutyronitrile as the initiator were added to 120 parts by weight of the $LiClo_4$ solution, following which the components were mixed, giving electrolyte composition B.

The resulting electrolyte composition B was placed between two copper sheets separated by a 200 $\mu$m gap and the ionic conductivity of the composition was measured by the AC impedance method at 25° C. A value of $4.3 \times 10^{-3}$ S/cm was obtained.

Production Example 8
Preparation of Electrolyte Composition D $LiClO_4$ was dissolved to a concentration of 1 mol/L in a mixture of equal parts by weight of ethylene carbonate and diethylene carbonate.

Twenty parts by weight of polyethylene glycol dimethacrylate (number of oxyethylene units=9), 10 parts by weight of methoxypolyethylene glycol monomethacrylate (number of oxyethylene units=9), 5 parts by weight of the cellulose derivative prepared in Synthesis Example 3 and 0.15 part by weight of azobisisobutyronitrile as the initiator were added to 120 parts by weight of the $LiClO_4$ solution, following which the components were mixed, giving electrolyte composition C.

The resulting electrolyte composition C was placed between two copper sheets separated by a 200 $\mu$m gap and the ionic conductivity of the composition was measured by the AC impedance method at 25° C. A value of $4.8 \times 10^{-3}$ S/cm was obtained

Production Example 9
Preparation of Electrolyte Composition E

LiClO$_4$ was dissolved to a concentration of 1 mol/L in a mixture of equal parts by weight of ethylene carbonate and diethylene carbonate.

Twenty parts by weight of polyethylene glycol dimethacrylate (number of oxyethylene units=9), 10 parts by weight of methoxypolyethylene glycol monomethacrylate (number of oxyethylene units=9), 5 parts by weight of the polyglycidol derivative prepared in Synthesis Example 4 and 0.15 part by weight of azobisisobutyronitrile as the initiator were added to 120 parts by weight of the LiClO$_4$ solution, following which the components were mixed, giving electrolyte composition D.

The resulting electrolyte composition D was placed between two copper sheets separated by a 200 μm gap and the ionic conductivity of the composition was measured by the AC impedance method at 25° C. A value of 4.5×10$^{-3}$ S/cm was obtained.

TABLE 1

| | | Ionic conductivity (S/cm) | Ratio* |
|---|---|---|---|
| Production Example 5 | Electrolyte composition A | 5.0 × 10$^{-3}$ | — |
| Production Example 6 | Electrolyte composition B | 4.3 × 10$^{-3}$ | 86% |
| Production Example 7 | Electrolyte composition C | 4.9 × 10$^{-3}$ | 98% |
| Production Example 8 | Electrolyte composition D | 4.8 × 10$^{-3}$ | 96% |
| Production Example 9 | Electrolyte composition E | 4.5 × 10$^{-3}$ | 90% |

*Ratio: Ionic conductivity of electrolyte compositions B to E, expressed as a percentage of the ionic conductivity of electrolyte composition A.

The results in Table 1 show that electrolyte compositions B to E (Production Examples 6 to 9) which formed semi-IPN structures had lower ionic conductivities than electrolyte composition A (Production Example 5), which did not form a semi-IPN structure.

Examples 1 to 11

In the examples according to the invention, polymer batteries were produced by using cell assemblies A to D and electrolyte compositions A to D in the combinations shown in Table 2. Production was carried out by placing one of the cell assemblies A to D in an aluminum laminate bag serving as the battery enclosure, then evacuating the interior of the bag so as to bring the laminate material up tight against the cell assembly. Next, one of electrolyte compositions A to D (see Table 2 for the combinations) was introduced into the cell assembly by a needle passing through a hole in the pouch, and thereby impregnated into the cell assembly. The bag was subsequently sealed and cured at 80° C. for 1 hour, giving the polymer batteries in each of Examples 1 to 11.

Comparative Examples 1 to 4

In the comparative examples, electrolyte solutions prepared by dissolving LiClO$_4$ to a concentration of 1 mol/L in a mixture of equal parts by weight of ethylene carbonate and diethylene carbonate were used instead of electrolyte compositions. The cell assembly shown in Table 2 was placed in an aluminum laminate bag as the battery enclosure and the electrolyte solution was introduced into the cell assembly, following which the bag was sealed, giving the batteries for each of Comparative Examples 1 to 4.

Each of the batteries thus produced was subjected to a 500 cycle charge/discharge test and a high-temperature holding test as described below. The results are shown in Table 2.

500-Cycle Charge/Discharge Test:

A 500-cycle charge/discharge test was conducted at a two hour rate of discharge (0.5 C) of theoretical capacity. That is, each battery was charged at 23° C. and a constant current and constant voltage to an upper limit of 4.2 V. Constant current discharge at 0.5 C was then carried out to a final voltage of 3.2 V. Using this method to determine the discharge capacity, the discharge output maintained after 500 cycles was calculated as a percentage of the initial discharge output.

High-Temperature Holding Test:

Each battery produced in the above examples was heated to 70° C. and held at that temperature for one week. The percent rise in the battery internal resistance after heating as opposed to before heating, was determined from the following formula.

$$\text{Percent rise in internal resistance } (\%) = \frac{B - A}{A} \times 100$$

In the formula, A represents the internal resistance before heating, and B is the internal resistance after heating. Both values are in ohms.

TABLE 2

| | Cell assembly | Electrolyte composition (or electrolyte only) | Discharge output after 500 cycles (% of initial discharge output) | Rise in impedance (%) |
|---|---|---|---|---|
| Example | | | | |
| 1 | A | A | 85 | 2 |
| 2 | A | B | 90 | 1.7 |
| 3 | A | C | 92 | 1.5 |
| 4 | A | D | 87 | 2.3 |
| 5 | A | E | 89 | 1.8 |
| 6 | B | A | 88 | 2 |
| 7 | C | A | 79 | 1.4 |
| 8 | C | B | 92 | 5.1 |
| 9 | D | A | 89 | 4 |
| 10 | D | B | 90 | 2.1 |
| 11 | D | C | 92 | 1.8 |
| 12 | D | D | 86 | 4.9 |
| 13 | D | E | 91 | 1.3 |
| Comparative Example | | | | |
| 1 | A | electrolyte only | 42 | 37 |
| 2 | B | electrolyte only | 50 | 53 |
| 3 | C | electrolyte only | 51 | 74 |
| 4 | D | electrolyte only | 38 | 200 |

Electrolyte Rate of Evaporation:

The rate of evaporation of the electrolyte solution was determined as described below using the following "working specimens" of electrolyte solutions according to the present invention and "comparative specimens" of electrolyte solutions which are not in accordance with the invention.

Working Specimen 1:

A polyvinylidene fluoride (PVDF) was prepared by mixing together 75 parts by weight of PVDF (weight-average molecular weight, 530,000; supplied by Aldrich Chemical Co., Ltd.), 25 parts by weight of SiO$_2$ powder (produced by Nippon Aerosil Co., Ltd. under the trade name Aerosil 200), and 1,000 parts by weight of N,N'-dimethylformamide (DMF) as the solvent.

The PVDF solution was coated onto a glass plate using a doctor knife applicator, then heated at 100° C. for 5 hours to evaporate off the solvent, thereby giving a separator film. A piece of the film having a surface area of 4 cm$^2$ was cut out and used as the separator.

Next, 20 parts by weight of polyethylene glycol dimethacrylate (number of oxyethylene units=9) and 10 parts by weight of methoxypolyethylene glycol monomethacrylate (number of oxyethylene units=9) were added together, following which 0.15 part by weight of azobisisobutyronitrile, based on the combined amount of the foregoing ingredients, was added and dissolved. To this first solution was added a second solution, composed of 1 M of $LiClO_4$ in equal parts by weight of ethylene carbonate and ethyl carbonate, in a 1:1 weight ratio between the two solutions so as to give an electrolyte solution. The separator produced above was thoroughly immersed in the electrolyte solution, giving a Working Specimen 1 according to the present invention which had a surface area of 4 $cm^2$ and a weight of about 1 g.

Working Specimen 2:

Aside from adding the two solutions (polyethylene glycol/catalyst solution and 1 M solution of $LiClO_4$ in ethylene carbonate and ethyl carbonate) in a weight ratio of 3:7, a Working Specimen 2 cut to a surface area of 4 $cm^2$ and having a weight of 1 g was prepared in the same way as for Working Specimen 1 above.

Comparative Specimen 1:

Aside from using a 1 M solution of $LiClO_4$ in equal parts by weight of ethylene carbonate and ethyl carbonate as the electrolyte solution, a Comparative Specimen 1 cut to a surface area of 4 $cm^2$ and having a weight of 1 g was prepared in the same way as for Working Sample 1 above.

Comparative Specimen 2:

About 1 g of a 1 M solution of $LiClO_4$ in equal parts by weight of ethylene carbonate and diethyl carbonate was placed in a receptacle having a surface area of 4 $cm^2$. This was used as Comparative Specimen 2.

Each specimen was held for 1,000 hours at 25° C., in dry air having a moisture content of about 2.55 ppm, and under an air circulation rate of 0.22 $m^3$/min. The percent weight loss of the electrolyte solution by evaporation following the 1,000 hour period was determined from the formula shown below.

$$\text{Percent weight loss of electrolyte solution by evaporation (\% by weight)} = \frac{A-B}{A} \times 100$$

In the formula, A is the film weight at the start of the test, and B is the film weight after 1,000 hours. Both values are in grams.

Figure 9:
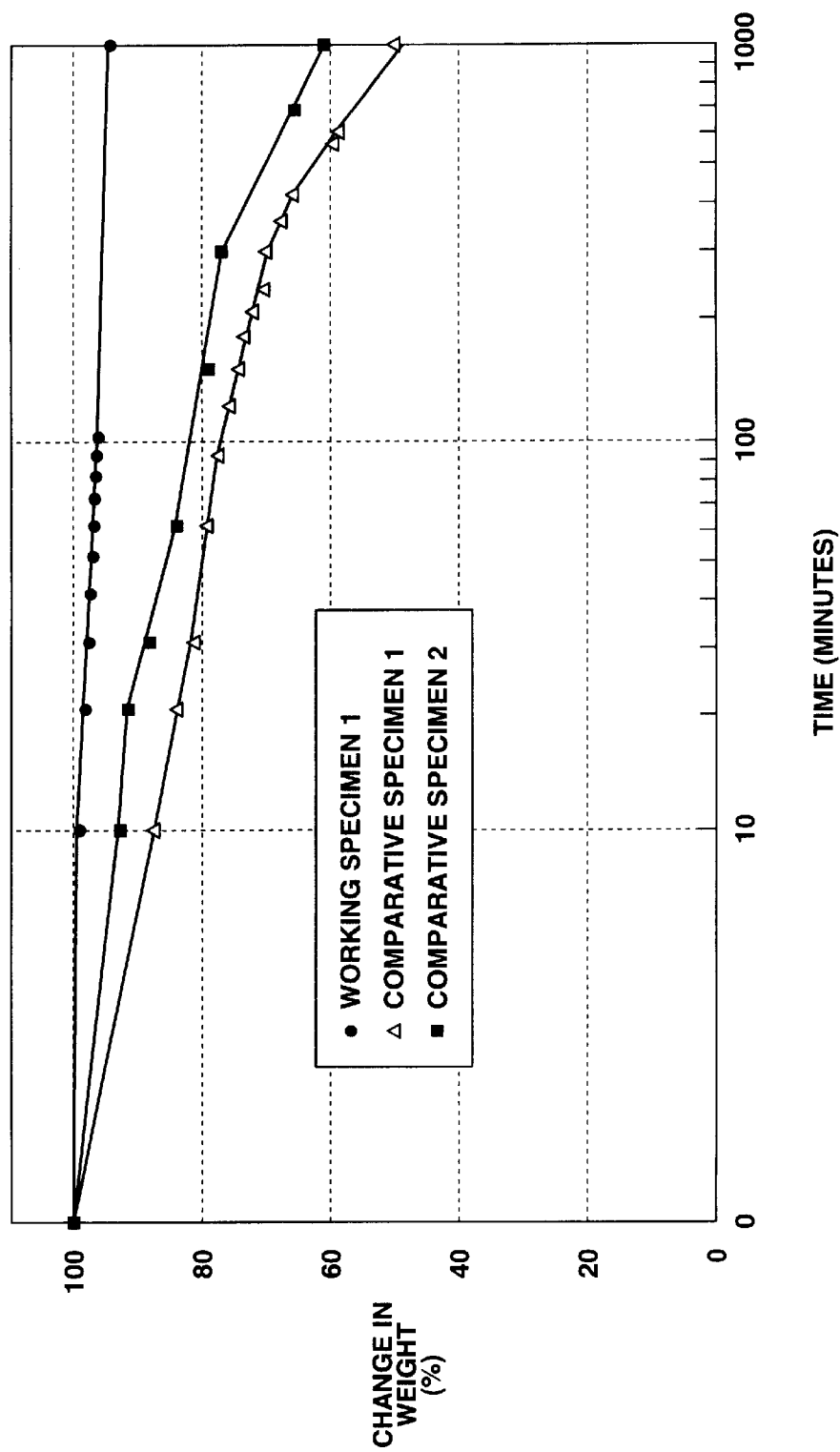
FIG. 9 is a graph showing the evaporation (change in weight) of an electrolyte solution.

The results are shown in Table 3. FIG. 9 shows the change over time in the weight of Working Specimen 1 and Comparative Specimens 1 and 2.

TABLE 3

|  | Loss of electrolyte solution by evaporation |
| --- | --- |
| Working Specimen 1 | 5% by weight |
| Working Specimen 2 | 5.7% by weight |
| Comparative Specimen 1 | 52% by weight |
| Comparative Specimen 2 | 40% by weight |

It is apparent from the results shown in Table 3 and FIG. 9 that vaporization occurred more readily in Comparative Specimen 1 (a prior-art fluoropolymer electrolyte solution) than in Comparative Specimen 2 (electrolyte solution). However, the loss of electrolyte by evaporation in both of these cases was very high compared with that in Working Specimens 1 and 2 according to the present invention.

As described above and demonstrated in the foregoing examples, the invention provides polymer batteries having excellent properties, including a high safety, good thermal cycling resistance, and robust characteristics even when held at a high temperature. The batteries according to the invention are thus particularly well suited to use as lithium secondary batteries and lithium ion secondary batteries.

What is claimed is:

1. A polymer battery comprising a cell assembly having a positive electrode, a negative electrode, and a separator disposed between the positive and negative electrodes that is composed primarily of a fluoropolymer; which battery is made by impregnating the cell assembly with an electrolyte composition containing (A) an ion-conductive salt, (B) a solvent in which the ion-conductive salt is soluble, and (C) a compound having at least two reactive double bonds per molecule, and reacting the component C compound to form a three-dimensional network structure.

2. The polymer battery of claim 1, wherein the electrolyte composition containing components A to C has an ionic conductivity, as measured by the AC impedance method, of at least $1 \times 10^{-4}$ S/cm.

3. A polymer battery comprising a cell assembly having a positive electrode, a negative electrode, and a separator disposed between the positive and negative electrodes that is composed primarily of a fluoropolymer; which battery is made by impregnating the cell assembly with an electrolyte composition containing (A) an ion-conductive salt, (B) a solvent in which the ion-conductive salt is soluble, (C) a compound having at least two reactive double bonds per molecule, and (D) a hydroxyalkyl polysaccharide derivative, and forming a semi-interpenetrating polymer network structure in which molecular chains on the component D polymer are interlocked with a three-dimensional polymer network structure obtained by crosslinking the component C compound.

4. The polymer battery of claim 3 having a ratio $(C_1/C_2) \times 100$ between the ionic conductivity $C_1$ of an electrolyte composition which contains components A to D and in which components C and D together form a semi-interpenetrating polymer network structure, and the ionic conductivity $C_2$ of an electrolyte composition which contains components A, B and C or components A, B and D and does not have a semi-interpenetrating polymer network structure of from 80 to 100%.

5. A polymer battery comprising a cell assembly having a positive electrode, a negative electrode, and a separator disposed between the positive and negative electrodes that is composed primarily of a fluoropolymer; which battery is made by impregnating the cell assembly with an electrolyte composition containing (A) an ion-conductive salt, (B) a solvent in which the ion-conductive salt is soluble, (C) a compound having at least two reactive double bonds per molecule, and (E) a polyvinyl alcohol derivative, and forming a semi-interpenetrating polymer network structure in which molecular chains on the component E polymer are interlocked with a three-dimensional polymer network structure obtained by crosslinking the component C compound.

6. The polymer battery of claim 5 wherein said polyvinyl alcohol derivative E is a polymeric compound containing polyvinyl alcohol units and having an average degree of polymerization of at least 20 in which some or all of the hydroxyl groups on the polyvinyl alcohol units are substituted with oxyalkylene-containing groups.

7. The polymer battery of claim 5 wherein said polyvinyl alcohol derivatives E is a polymeric compound containing polyvinyl alcohol units and having an average degree of polymerization of at least 20 in which some or all of the hydroxyl groups on the polyvinyl alcohol units are substituted with both oxyalkylene-containing groups and cyano-substituted monovalent hydrocarbon groups.

8. The polymer battery of claim 5 wherein said polyvinyl alcohol derivative E is a polymeric compound containing polyvinyl alcohol units and having an average degree of polymerization of at least 20 in which some or all of the hydroxyl groups on the polyvinyl alcohol units are substituted with cyano-substituted monovalent hydrocarbon groups.

9. The polymer battery of claim 8 wherein the polymeric compound having substituted thereon cyano-substituted monovalent hydrocarbon groups is included in an amount of 0.1 to 8 wt % based on the compound having at least two reactive double bonds per molecule C.

10. The polymer battery of claim 7, 8 or 9 wherein the cyano-substituted monovalent hydrocarbon groups are cyanoethyl groups.

11. The polymer battery of claim 5 having a ratio $(C_1/C_2) \times 100$ between the ionic conductivity $C_1$ of an electrolyte composition which contains components A, B, C and E and in which components C and E together form a semi-interpenetrating polymer network structure, and the ionic conductivity $C_2$ of an electrolyte composition which contains components A, B and C or components A, B and E and does not have semi-interpenetrating polymer network structure of from 80% to 100%.

12. A polymer battery comprising a cell assembly having a positive electrode, a negative electrode, and a separator disposed between the positive and negative electrodes that is composed primarily of a fluoropolymer; which battery is made by impregnating the cell assembly with an electrolyte composition containing
    (A) an ion-conductive salt,
    (B) a solvent in which the ion-conductive salt is soluble,
    (C) a compound having at least two reactive double bonds per molecule, and
    (F) a polyglycidol derivative,
and forming a semi-interpenetrating polymer network structure in which molecular chains on the component F polymer are interlocked with a three-dimensional polymer network structure obtained by crosslinking the component C compound.

13. The polymer battery of claim 12 having a ratio $(C_1/C_2) \times 100$ between the ionic conductivity $C_1$ of an electrolyte composition which contains components A, B, C and F and in which components C and F together form a semi-interpenetrating polymer network structure, and the ionic conductivity $C_2$ of an electrolyte composition which contains components A, B and C or components A, B and F and does not have a semi-interpenetrating polymer network structure of from 80 to 100%.

14. The polymer battery of any one of claims 1, 3, 5, and 12, wherein the compound having at least two reactive double bonds per molecule C has at least two reactive double bonds per molecule and constitutes at least 1 wt % of the overall electrolyte composition.

15. A method of manufacturing a polymer battery, the method comprising the steps of:
    (a) impregnating an electrolyte composition containing
        (A) an ion-conductive salt,
        (B) a solvent in which the ion-conductive salt is soluble, and
        (C) a compound having at least two reactive double bonds per molecule
    into a cell assembly having a positive electrode, a negative electrode, and a separator disposed between the positive and negative electrodes that is composed primarily of a fluoropolymer; then
    (b) reacting component C to form a three-dimensional network structure.

16. A method of manufacturing a polymer battery, the method comprising the steps of:
    (a) impregnating an electrolyte composition containing
        (A) an ion-conductive salt,
        (B) a solvent in which the ion-conductive salt is soluble,
        (C) a compound having at least two reactive double bonds per molecule, and
        (D) a hydroxyalkyl polysaccharide derivative into a cell assembly having a positive electrode, a negative electrode, and a separator disposed between the positive and negative electrodes that is composed primarily of a fluoropolymer; then
    (b) forming a semi-interpenetrating polymer network structure in which molecular chains on the component D polymer are interlocked with a three-dimensional polymer network structure obtained by crosslinking the component C compound.

17. A method of manufacturing a polymer battery, the method comprising the steps of:
    (a) impregnating an electrolyte composition containing
        (A) an ion-conductive salt,
        (B) a solvent in which the ion-conductive salt is soluble,
        (C) a compound having at least two reactive double bonds per molecule, and
        (E) a polyvinyl alcohol derivative into a cell assembly having a positive electrode, a negative electrode, and a separator disposed between the positive and negative electrodes that is composed primarily of a fluoropolymer; then
    (b) forming a semi-interpenetrating polymer network structure in which molecular chains on the component E polymer are interlocked with a three-dimensional polymer network structure obtained by crosslinking the component C compound.

18. A method of manufacturing a polymer battery, the method comprising the steps of:
    (a) impregnating an electrolyte composition containing
        (A) an ion-conductive salt,
        (B) a solvent in which the ion-conductive salt is soluble,
        (C) a compound having at least two reactive double bonds per molecule, and
        (F) a polyglycidol derivative into a cell assembly having a positive electrode, a negative electrode, and a separator disposed between the positive and negative electrodes that is composed primarily of a fluoropolymer; then
    (b) forming a semi-interpenetrating polymer network structure in which molecular chains on the component F polymer are interlocked with a three-dimensional polymer network structure obtained by crosslinking the component C compound.

* * * * *